US008208676B2

(12) United States Patent
Murozaki et al.

(10) Patent No.: US 8,208,676 B2

(45) Date of Patent: Jun. 26, 2012

(54) EARPIECE AND EARPHONE

(75) Inventors: Katsunori Murozaki, Chiba (JP); Koji Nageno, Tokyo (JP); Kiminobu Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 12/621,907

(22) Filed: Nov. 19, 2009

(65) Prior Publication Data

US 2010/0135517 A1 Jun. 3, 2010

(30) Foreign Application Priority Data

Nov. 28, 2008 (JP) ................................ 2008-304885

(51) Int. Cl.
*H04R 1/02* (2006.01)
*H04M 1/00* (2006.01)

(52) U.S. Cl. ........................................ 381/386; 381/380

(58) Field of Classification Search .................. 381/380, 381/386, 322; 379/430
See application file for complete search history.

(56) References Cited

U.S. PATENT DOCUMENTS 3,935,401 A 1/1976 Shore et al.
6,094,494 A * 7/2000 Haroldson .................... 381/328
7,120,268 B2 10/2006 Murozaki et al.
2004/0045558 A1 3/2004 Taylor et al.
2005/0244026 A1* 11/2005 Nielsen et al. ................ 381/380
2006/0067551 A1* 3/2006 Cartwright et al. ........... 381/322
2007/0201717 A1* 8/2007 Dyer et al. .................... 381/380
2008/0273737 A1 11/2008 Oosato et al.
2009/0245529 A1 10/2009 Asada et al.
2009/0323976 A1 12/2009 Asada et al.
2010/0046782 A1 2/2010 Ito et al.
2011/0002497 A1 1/2011 Fukuma
2011/0007926 A1 1/2011 Murozaki

FOREIGN PATENT DOCUMENTS

JP 53-066223 U 6/1978
JP 63-013000 U 1/1988
JP 06-034393 U 5/1994
JP 8-98290 4/1996
JP 2003-143682 A 5/2003
JP 2005-268990 A 9/2005
JP 2005-323363 A 11/2005
JP 2005-537859 A 12/2005
JP 3121893 U 5/2006
JP 3815513 6/2006

* cited by examiner

*Primary Examiner* — Davetta W Goins
*Assistant Examiner* — Phan Le
(74) *Attorney, Agent, or Firm* — Wolf, Greenfield & Sacks, P.C.

(57) ABSTRACT

There is provided an earpiece comprising: a main unit having a cylindrical shape having made therein a through hole that can allow sound to be transmitted therethrough; a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as it goes toward the rear-end surface side; and at least one cutting portion formed in the cap portion so that the cap portion can deform in a direction of the main unit.

11 Claims, 28 Drawing Sheets

EARPIECE AND EARPHONE

BACKGROUND OF THE INVENTION

1. Field of the Invention

The present invention relates to an earpiece and an earphone.

2. Description of the Related Art

In recent years, portable audio playback apparatuses have widely proliferated. The audio playback apparatuses output audio from earphones, for example, and thereby provide the sound to users. For the earphones, various types are available and the taste of earphones often varies from user to user. As an example of the earphones, numbers of earphones, called earplug type (canal type), are commercialized in which an earpiece is attached to a front end of a sound conduit. However, the size of an ear canal varies from user to user. Thus, when the user places an earphone, if the size of an earpiece is small, there is more sound leakage, degrading sound quality. On the other hand, when the user places an earphone, if the size of an earpiece is large, it is difficult to put the earpiece in an ear canal, which may even cause pain in the ear canal. In view of this, in an earphone described in, for example, Japanese Patent No. 3815513, etc., earpieces of a plurality of sizes, such as S, M, and L, are sold in a package according to the size of an ear, to support users with different sizes of ear canals.

SUMMARY OF THE INVENTION

However, when the user buys an earphone such as that described above, the user has to buy unnecessary earpieces of a plurality of sizes which may not be used, too, increasing the price of products. In view of this, earpieces are developed that can be applied to people with different sizes of ears, with one earpiece without attaching a plurality of types of earpieces. In this earpiece, each cap portion which abuts a user's ear is formed by a plurality of stages with different sizes, which enables to support the size of a user's ear canal. With such an earpiece, however, many users get an uncomfortable feeling in fit, e.g., stages that do not match the size of a user's ear canal press the user's ear canal, and thus earpieces with further improved fit are sought.

As shown in Japanese Patent Application Laid-Open No. 8-98290, there is also an earphone in which the outside diameter of an ear pad can be changed with a screw. However, even in this earphone, adjusting the ear pad to fit the size of an ear canal is troublesome for users. In addition, such an adjustment is not easy and when an optimal adjustment is not made after all, fit is not improved in reality.

In light of the foregoing, it is desirable to provide a novel and improved earpiece and earphone that can be easily placed and can improve fit for various users with different sizes of ear canales without preparing a plurality of sizes.

According to an embodiment of the present invention, there is provided an earpiece comprising: a main unit having a cylindrical shape having made therein a through hole that can allow sound to be transmitted therethrough; a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as it goes toward the rear-end surface side; and at least one cutting portion formed in the cap portion so that the cap portion can deform in a direction of the main unit.

At least two cutting portions may be formed from an end of the cap portion on the rear-end surface side toward the front-end surface side, and the cap portion may be divided into two or more cap pieces which are connected to each other on the front-end surface side.

In the at least one cutting portion may be formed an extension cap piece that is formed to extend from one of cap pieces divided by the cutting portion toward an other cap piece and that covers a part of the cutting portion, and a thickness of the extension cap piece decreases as it goes farther away from the one cap piece, so that the extension cap piece overlaps the other cap piece when the cap portion deforms in the direction of the main unit.

The earpiece may further comprise a connecting film that is formed in the at least one cutting portion, to a thickness thinner than the cap portion and that connects two cap pieces divided by the cutting portion.

The earpiece connecting film may have a shape bending toward a side of the main unit between the two divided cap pieces.

The earpiece may further comprise a supporting portion between the main unit and the cap portion near a connecting location of the front-end surface of the main unit to the cap portion, the supporting portion supporting the cap portion.

The earpiece cap portion may have a multi-layer structure in which layers are stacked on top of each other in a thickness direction so as to be spaced apart from each other, and the cutting portion may be formed at different locations for the different layers.

The cutting portion may be formed in a portion of the cap portion between the rear-end surface side and the front-end surface side to make a through hole in the cap portion in the direction of making the through hole.

The cutting portions may be formed in a width in which space between the divided cap pieces expands as it goes toward the rear-end surface side.

The cutting portions may be formed in a length shorter than a length of the cap portion from the rear-end surface side to the front-end surface side.

According to another embodiment of the present invention, there is provided an earphone comprising: a drive unit that originates sound; and an earpiece that transmits the sound originated from the drive unit into an ear canal while being inserted into an ear of a listener and thereby supporting the drive unit, wherein the earpiece includes: a main unit having a cylindrical shape having made therein a through hole that communicates between the drive unit and the ear canal; a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as it goes toward the rear-end surface side; and at least one cutting portion formed in the cap portion so that the cap portion can deform in a direction of the main unit.

As described above, according to the present invention, an earpiece and an earphone can be easily placed and fit can be improved for various users with different sizes of ear canals without preparing a plurality of sizes.

DETAILED DESCRIPTION OF EMBODIMENT

Figure 1A:
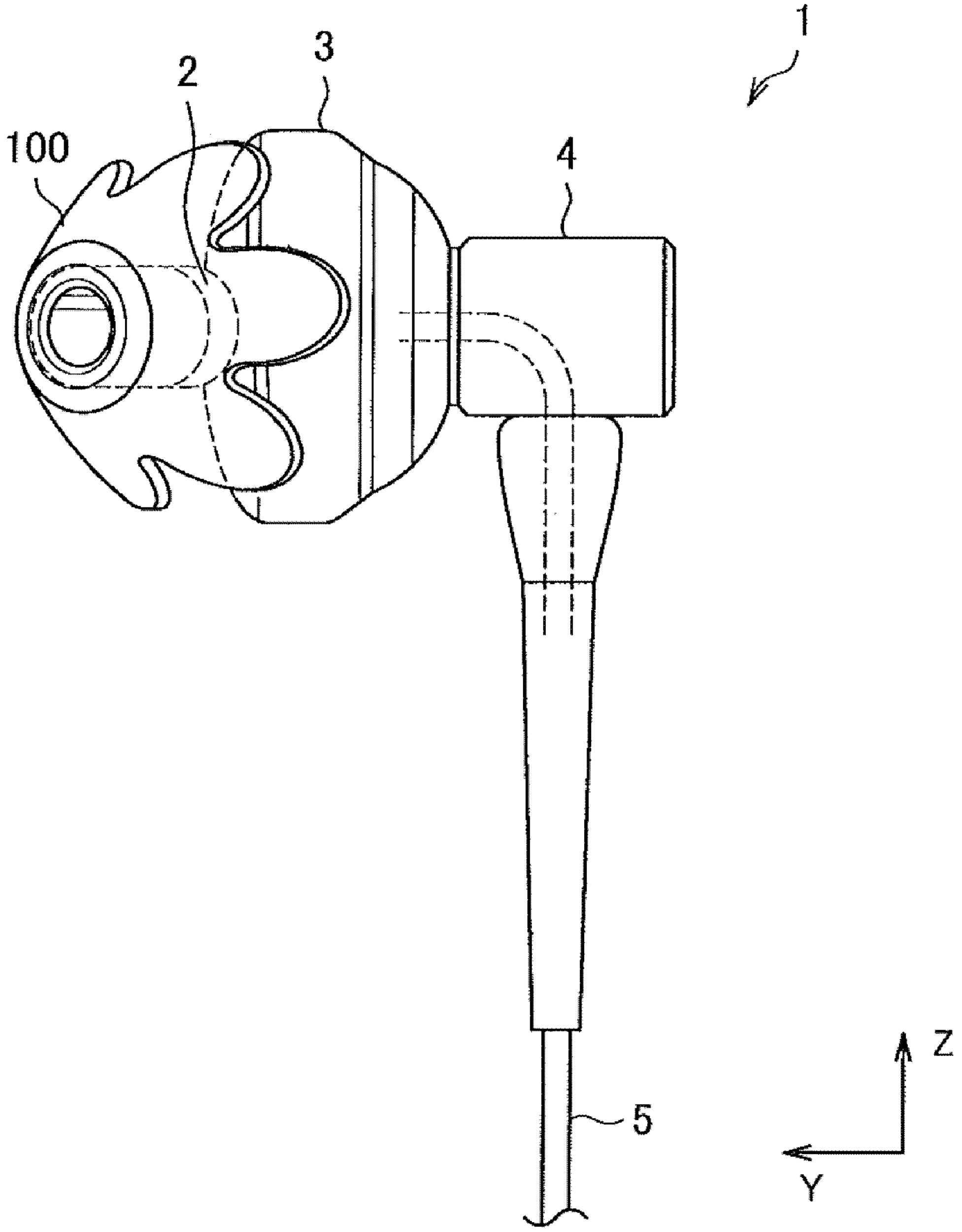
FIG. 1A is an explanatory diagram for describing an example of an earphone to which earpieces according to embodiments of the present invention are applied.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In an earpiece according to one embodiment of the present invention, a cap portion which abuts a user's ear canal upon placement deforms according to the shape of the user's ear canal, which enables the earpiece to be used easily and comfortably. To facilitate the understanding of effects, etc., of the earpiece, first, an earpiece according to related art will be described and then an example of an earphone to which earpieces according to embodiments of the present invention are applied will be described. Thereafter, the earpieces according to the embodiments of the present invention will be described. Then, finally, technical ideas of the embodiments are summarized and actions and effects obtained from the technical ideas will be briefly described. Specifically, in the following, description is made in the following order:

1. Earpiece according to related art

2. Example of an earphone to which earpieces according to embodiments of the present invention are applied 3. Embodiments of the present invention 4. Conclusions <1. Earpiece According To Related Art>

Figure 15A:
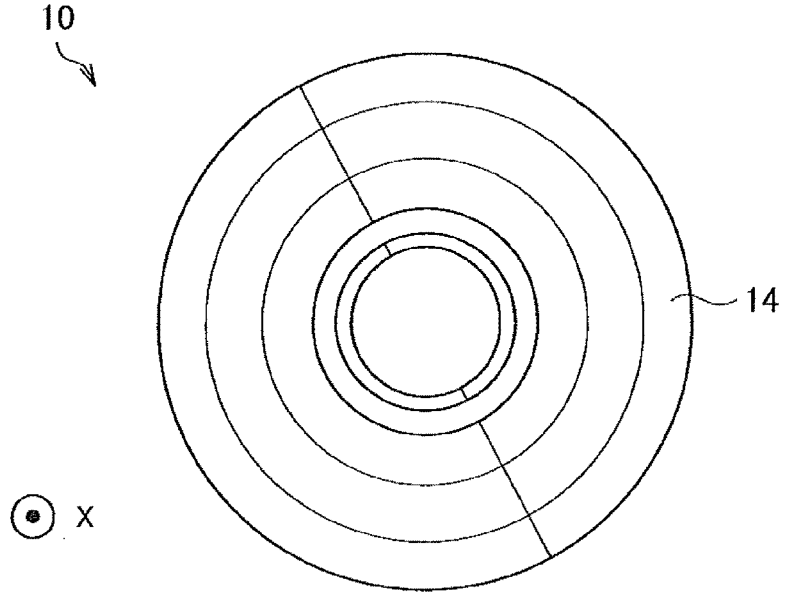
FIG. 15A is an explanatory diagram for describing the configuration of an earpiece according to the related art.
Figure 15B:
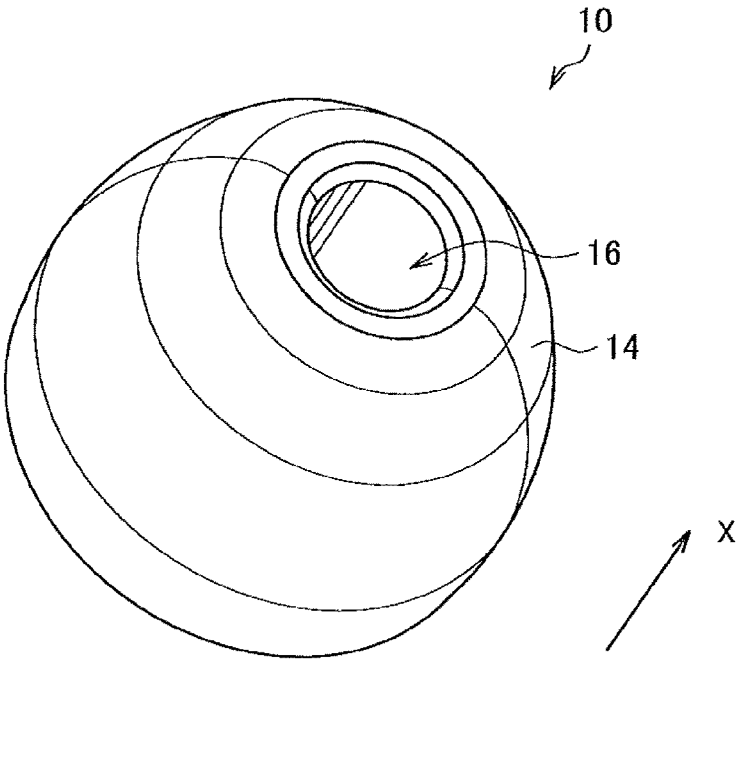
FIG. 15B is an explanatory diagram for describing the configuration of the earpiece according to the related art.
Figure 15C:
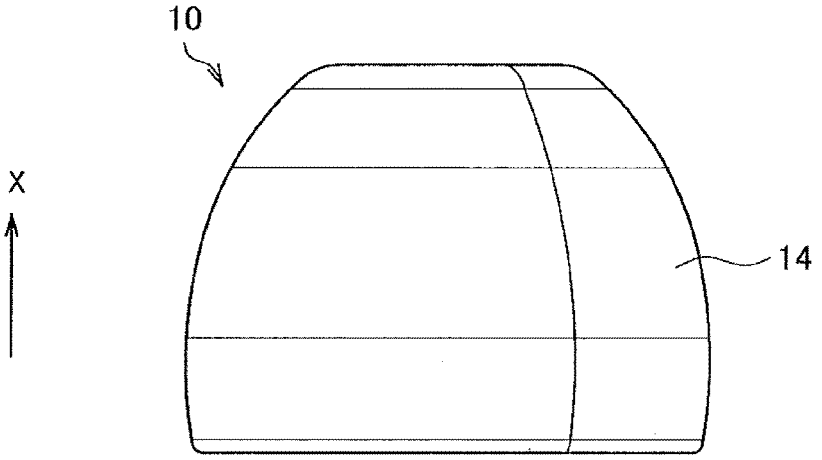
FIG. 15C is an explanatory diagram for describing the configuration of the earpiece according to the related art.
Figure 15D:
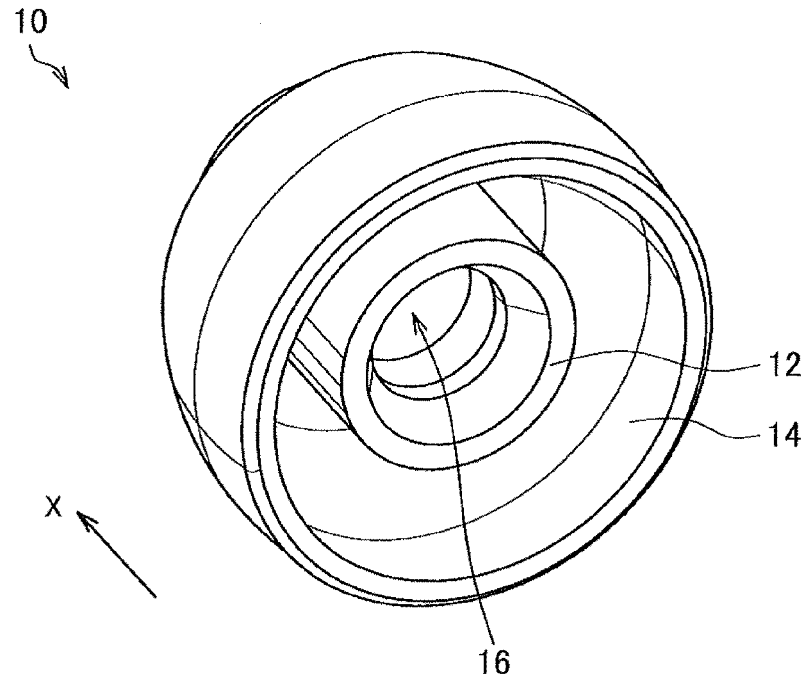
FIG. 15D is an explanatory diagram for describing the configuration of the earpiece according to the related art.
Figure 16:
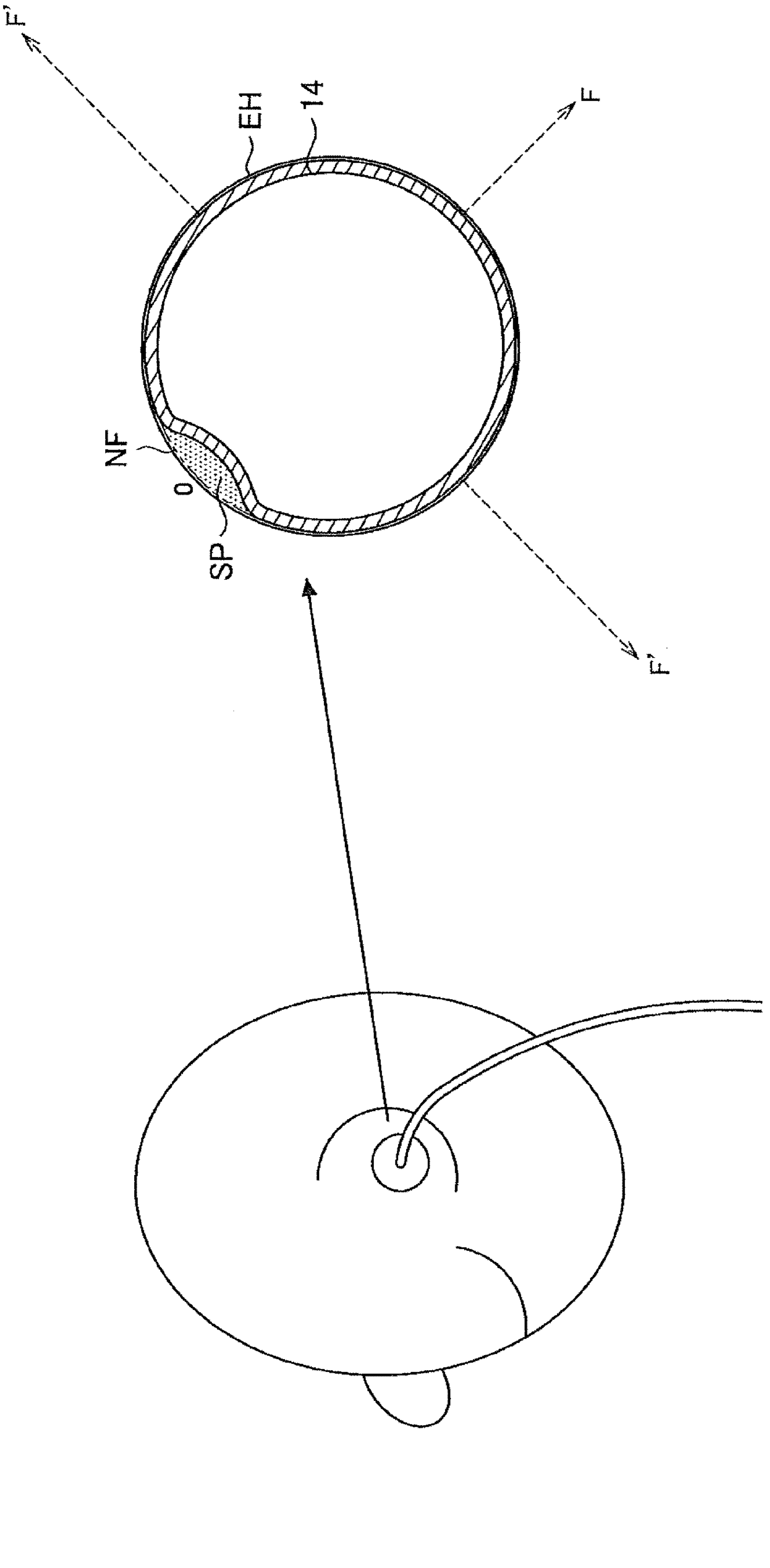
FIG. 16 is an explanatory diagram for describing a deformation state for when an earpiece according to related art is placed.

First, an earpiece according to related art will be described with reference to FIGS. 15A to 16. FIGS. 15A to 15D are explanatory diagrams for describing a configuration of an earpiece according to related art. FIG. 16 is an explanatory diagram for describing a deformation state for when the earpiece according to the related art is placed.

Note that an earpiece 10 according to the related art shown in FIG. 15A, etc., is connected to a front end of an earphone, etc. When the earphone is used, the earpiece 10 is inserted into a user's ear canal and abuts the ear canal, whereby the earphone is supported by the ear canal. Note that, in the following description, description of the earphone is omitted and the earpiece 10 according to the related art will be described.

As shown in FIGS. 15A to 15D, the earpiece 10 in the related art has a main unit 12 and a cap portion 14.

The main unit 12 has a substantially cylindrical shape having a through hole 16 made therein and introduces sound generated by an audio generating unit of the earphone to the user's ear canal. The cap portion 14 is formed to extend from a front-end surface (surface in an X-axis position direction) of the main unit 12 to the side of a rear-end surface (surface in an X-axis negative direction) so as to cover the main unit 12, and is thereby formed in a cap-like shape covering the entire main unit 12. When the earpiece 10 is inserted into the user's ear canal from a front-end surface direction, the cap portion 14 abuts a sidewall of the user's ear canal and thereby supports the main unit 12 and consequently supports the earphone connected to the main unit 12.

That is, when the user places an earphone having the earpiece 10 according to the related art, sound originated from a drive unit of the earphone is transmitted to the main unit 12 of the earpiece 10 according to the related art. The transmitted sound is delivered to the ear canal through the through hole 16 of the main unit 12. On the other hand, the cap portion 14 not only comes into contact with a user's ear and supports the earphone itself but also acts to improve the fit of the earpiece 10 to the user's ear.

Now, a state in which such an earpiece 10 according to the related art is placed in the user's ear canal will be described with reference to FIG. 16. FIG. 16 shows a cross-sectional shape of the earpiece 10 on a plane vertical to an X-axis, together with an ear canal EH.

When the fit of the earpiece 10 to the user is considered, it is desirable that the entire rim of the cap portion 14 of the earpiece 10 be in contact with the ear canal EH so that a uniform pressure F is applied to the entire ear canal EH. However, in practice, the size of the ear canal EH varies from person to person. For example, there may be a case in which, as shown in FIG. 16, since the size of the ear canal EH does not match the size of the cap portion 14, the cap portion 14 distorts. Hence, great pressures F' may be locally applied to the ear canal EH being in contact with the cap portion 14 or there may be an area NF where no pressure is applied. As such, unbalancing may occur in pressure applied to the user's ear canal EH. Such unbalancing of pressure may significantly impair fit to the user. In addition, with such unbalancing, space SP may be created between the ear canal EH and the cap portion 14, which may cause sound leakage. Such sound leakage possibly influences the quality of sound the user listens to. Accordingly, earpieces require an improvement in fit while such sound leakage is suppressed.

As a result of performing earnest development to improve fit, etc., of the earpiece according to the related art, etc., the inventors of the present invention have completed embodiments of the present invention. The embodiments of the present invention will be described below. Note that, as described above, before describing the embodiments, an example of an earphone to which earpieces according to the embodiments of the present invention are applied will be described with reference to FIGS. 1A to 1C and 2.

<2. Example of an Earphone to which Earpieces According to Embodiments of the Present Invention are Applied>

Figure 1B:
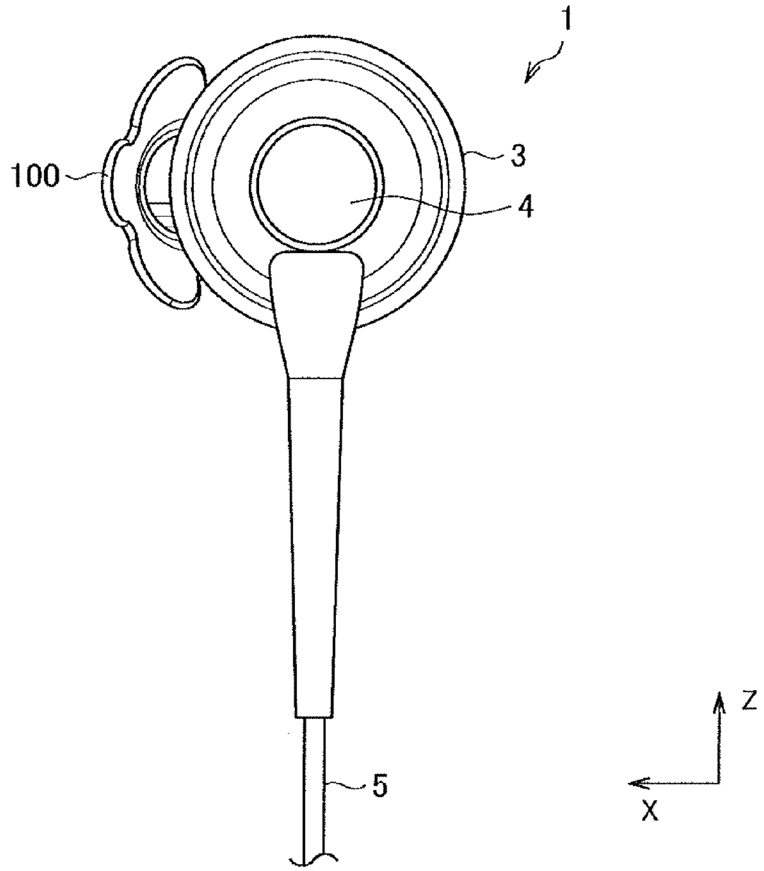
FIG. 1B is an explanatory diagram for describing an example of an earphone to which earpieces according to embodiments of the present invention are applied.
Figure 1C:
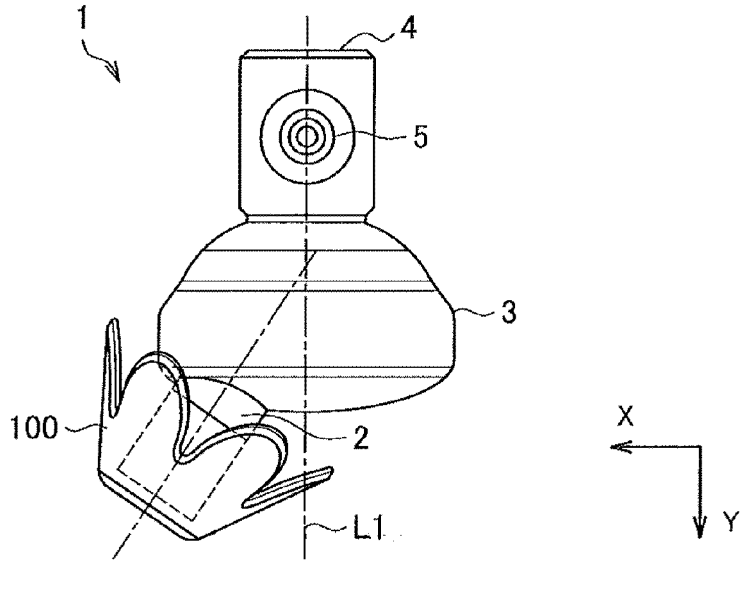
FIG. 1C is an explanatory diagram for describing an example of an earphone to which earpieces according to embodiments of the present invention are applied.
Figure 2:
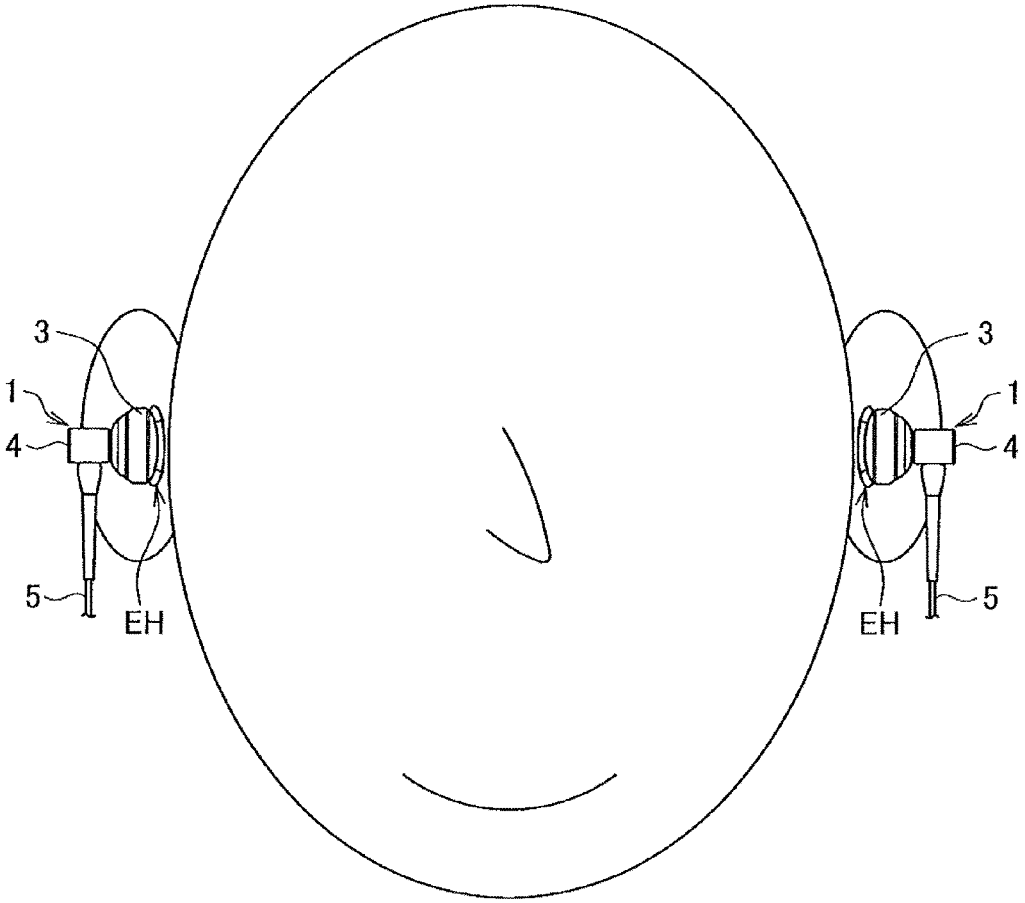
FIG. 2 is an explanatory diagram for describing a state in which the earphone to which the earpieces according to the embodiments of the present invention are applied is placed.

FIGS. 1A to 1C are explanatory diagrams for describing an example of an earphone to which earpieces according to embodiments of the present invention are applied. FIG. 2 is an explanatory diagram for describing a state in which the earphones to which the earpieces according to the embodiments of the present invention are applied are placed. Note that FIGS. 1A to 1C are projection views of an earphone 1 as seen from different directions and FIG. 1A is a side view, FIG. 1B is a rear view, and FIG. 1C is a top view. Note also that earpieces according to the embodiments of the present invention are not limited in its application to an example of an earphone taken here and can be applied to earphones of various modes.

As shown in FIGS. 1A to 1C, the earphone 1 has an earpiece 100, a sound conduit 2, a housing 3, a cord holding portion 4, and a cord 5.

The earpiece 100 is connected to a front end (Y-axis positive and X-axis positive directions) of the sound conduit 2. As shown in FIG. 2, the earpiece 100 is inserted into a user's ear canal upon placement and abuts an inner wall of the ear canal, whereby the earphone 1 is allowed to maintain a state in which the earpiece 100 is inserted into the user's ear canal. At this time, the earpiece 100, etc., according to the embodiments of the present invention have a configuration that enables to easily improve fit regardless of the size of a user's ear canal and a specific configuration will be described in detail in each embodiment.

While the sound conduit 2 has the earpiece 100 connected to the front end thereof, the housing 3 is connected to a rear end of the sound conduit 2 and a through hole that allows sound to be transmitted therethrough is provided between the two ends. The housing 3 contains therein a drive unit that originates sound. That is, sound originated from the drive unit contained in the housing 3 is transmitted in a front-end direction through the through hole of the sound conduit 2 and is further transmitted into the ear canal through the earpiece 100. At this time, the sound conduit 2 is formed to extend inclined in the X-axis positive direction (forward of the user upon placement) with respect to an axis L1 along which the housing 3 is formed. Therefore, when the user places the earphones 1, as shown in FIG. 2, while the sound conduit 2 and the earpiece 100 of each earphone 1 are inserted into an ear canal, the housing 3 is located outside the ear canal near the ear canal. As a result, the containment space inside the housing 3 can be increased, enabling to improve the sound quality of sound originated from the drive unit.

Meanwhile, the cord holding portion 4 fixes the cord 5 which is connected to the drive unit and pulled out of the housing 3, to the housing 3, and is grasped by the user when the earphone 1 is handled.

The earphone 1 having such a configuration improves fit by disposing the sound conduit 2 on the outer side of a central position (axis L1) of the housing 3. Namely, as described above, while the earpiece 100 is inserted into the ear canal, the housing 3 fits the shape of the ear near the ear canal, enabling to enhance fit. In addition, the fact that the earphone 1 is supported by the ear using not only the earpiece 100 but also the housing 3 results in enhancement of fit.

The shape of an earphone to which earpieces according to the embodiments of the present invention are applied is not limited to that described above and may be other shapes of earplug type (canal type) earphones. Note also that earpieces according to the embodiments which will be described below can be used not only as earphones but also as earplugs in the sense of being inserted into ear canals. However, for convenience of description, in the following, the case will be described in which earpieces according to the embodiments are applied to the earphone 1 described in FIG. 1A, etc. Earpieces according to the embodiments can significantly improve fit even with other types of earphones (e.g., a type in which a sound conduit is arranged in a front direction (Y-axis positive direction) of a housing); however, when the earpieces are applied to the earphone 1, fit can be improved synergistically with the aforementioned structure.

<3. Embodiments of the Present Invention>

Embodiments of the present invention will be described below. Note that, in the following, first, a first embodiment which is a basic embodiment of the present invention will be described and then other embodiments will be described mainly in terms of differences from the first embodiment. Hence, description of the same components as those in the first embodiment is appropriately omitted. Note that earpieces according to the embodiments which will be described below further transmit sound transmitted from a sound conduit 2, into an ear canal and the direction in which the sound travels is hereafter referred to as the "front-end surface direction (X-axis positive direction)". That is, a front end, forward, above, etc., indicate directions in which sound travels and a rear end, rearward, and bottom indicate directions opposite to the directions in which sound travels.

(First Embodiment: an earpiece having cuttings in a cap portion)

Figure 3A:
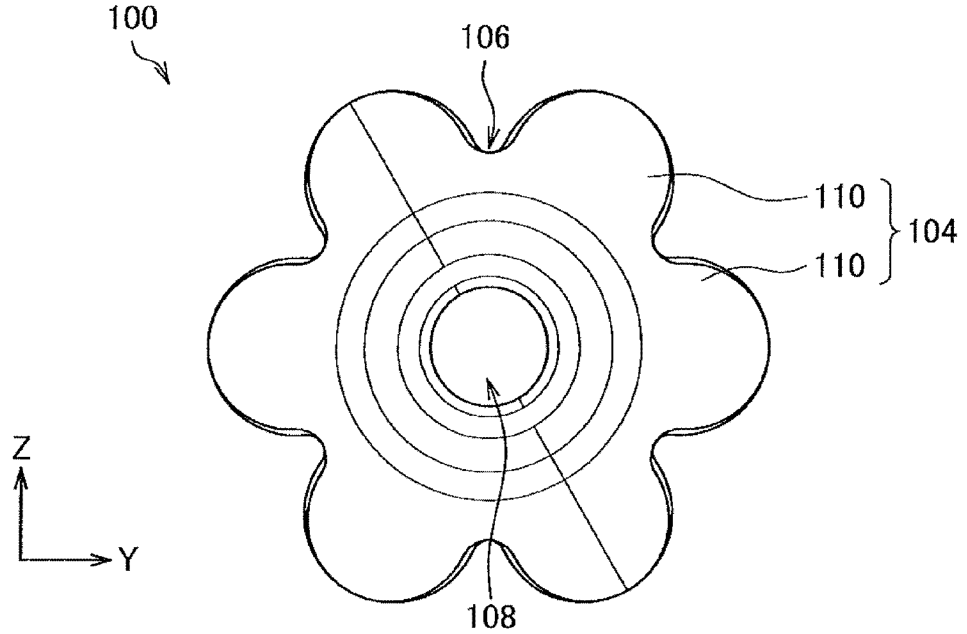
FIG. 3A is an explanatory diagram for describing an earpiece according to a first embodiment of the present invention.
Figure 3B:
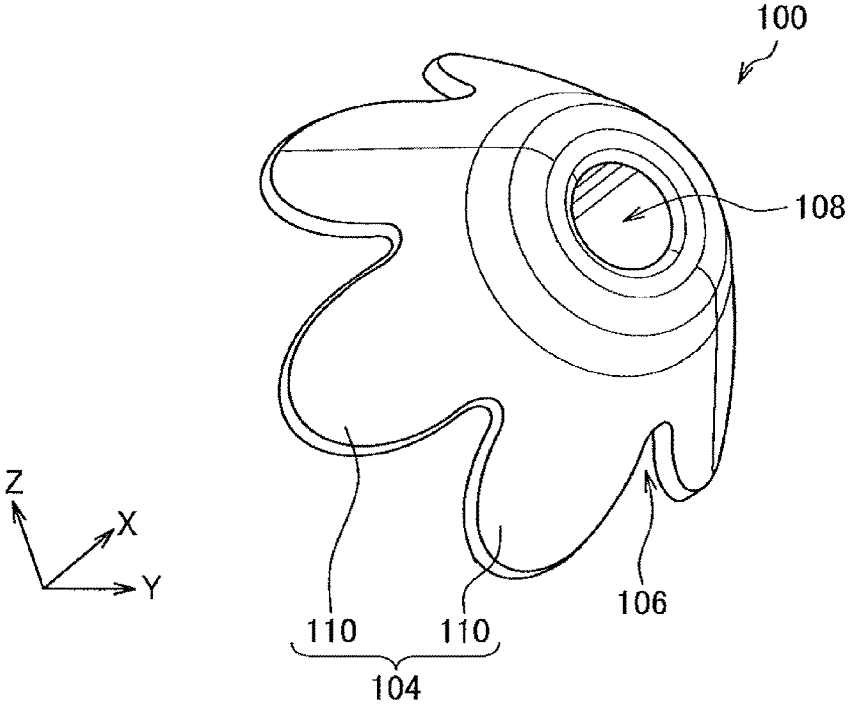
FIG. 3B is an explanatory diagram for describing the earpiece according to the embodiment.
Figure 3C:
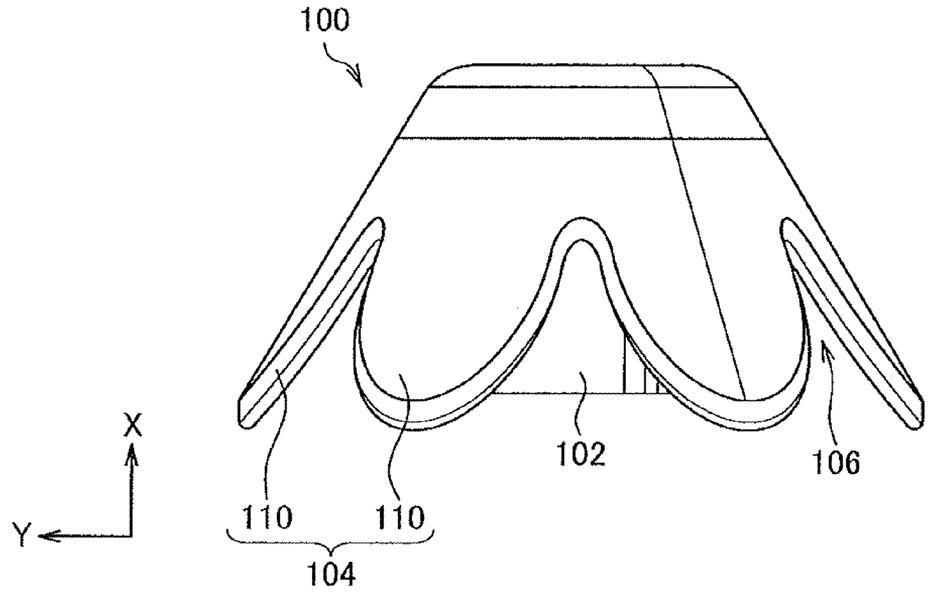
FIG. 3C is an explanatory diagram for describing the earpiece according to the embodiment.
Figure 3D:
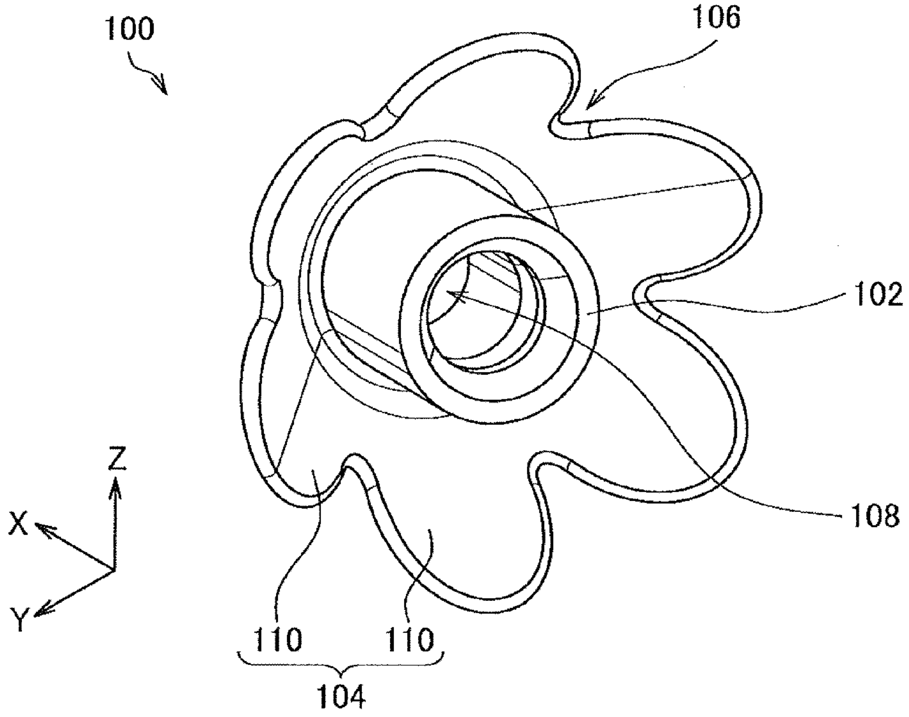
FIG. 3D is an explanatory diagram for describing the earpiece according to the embodiment.

FIGS. 3A to 3D are explanatory diagrams for describing an earpiece according to a first embodiment of the present invention. FIG. 3A is a top view of an earpiece as seen from above (X-axis positive direction) and FIG. 3B is a perspective view of the earpiece as seen from diagonally forward (X-axis positive, Y-axis negative, and Z-axis negative directions). FIG. 3C is a side view of the earpiece as seen from a lateral direction (Z-axis positive direction) and FIG. 3D is a perspective view of the earpiece as seen from diagonally rearward (X-axis negative, Y-axis positive, and Z-axis positive directions).

As shown in FIGS. 3A to 3D, the earpiece 100 according to the present embodiment mainly has a main unit 102 and a cap portion 104.

The main unit 102 is a structural member that supports the cap portion 104 of an earpiece 100. As shown in FIG. 3D, the main unit 102 has a substantially cylindrical shape and a through hole 108 is provided in a central portion thereof. The through hole 108 is made in a direction in which sound travels (X-axis direction). Sound transmitted through a sound conduit 2 of an earphone 1 is transmitted through the through hole 108. That is, the main unit 102 is connected and fixed to the sound conduit 2 at an end thereof on the rear-end surface side (X-axis negative direction) such that a through hole of the sound conduit 2 and the through hole 108 communicate with each other. When the earphone 1 is placed, the front-end surface side (X-axis positive direction) of the main unit 102 is inserted into an ear canal EH. Therefore, sound originated from a drive unit in a housing 3 of the earphone 1 is sequentially transmitted through the through hole of the sound conduit 2 and the through hole 108 of the main unit 102 and then transmitted into the user's ear canal EH.

The cap portion 104 is formed to extend from all around the front-end surface, in a direction of providing the through hole 108, of the main unit 102 toward the rear-end surface side. That is, the cap portion 104 of a substantially parabolic shape is formed to extend from a substantially circular end surface, in a direction of insertion into the ear canal EH (X-axis positive direction), of the main unit 102 toward the opposite side of the insertion direction. As shown in FIG. 3A, the cap portion 104 is formed all around the main unit 102 and is formed in a film-like shape covering at least a portion of the main unit 102 on the front-end surface side. At this time, as shown in FIG. 3D, the cap portion 104 is formed to be spaced apart from the main unit 102 such that a predetermined space is created between the cap portion 104 and the main unit 102, except that a portion of the cap portion 104 on the front-end surface side is connected to the main unit 102. The space created between the cap portion 104 and the main unit 102 is set so as to expand at least once as it goes toward the rear-end surface side. Although, as shown in FIG. 3C, the space between the cap portion 104 and the main unit 102 in the present embodiment expands as it goes toward the rear-end surface side, the space may be set such that the space expands once and then shrinks. In this case, the shape of the cap portion 104 is as if a lantern. However, here, the shape of the cap portion 104 is shown as a substantially parabolic shape. The shape of the cap portion 104 can take a variety of shapes as long as the shape can allow the cap portion 104 to be placed in the ear. The cap portion 104 may cover the entire main unit 102 or may cover only a part of the main unit 102.

In the cap portion 104, at least one cutting portion 106 is formed. Although FIG. 3A, etc., show the case of forming six cutting portions 106, any number of cutting portions 106 can be formed as long as the number is one or more. When a plurality of cutting portions 106 are formed, as shown in FIG. 3B, etc., the cap portion 104 is divided into a plurality of cap pieces 110. The cutting portions 106 and the cap pieces 110 will be described.

The cutting portions 106 are formed in the cap portion 104 so that the cap portion 104 can deform in the direction of the main unit 102. As described above, when two or more cutting portions 106 are formed in the cap portion 104, the cap portion 104 is divided into two or more cap pieces 10. Although in FIGS. 3A to 3D the cutting portions 106 are formed at six locations, the number of the cutting portions 106 is not particularly limited.

Each of the cutting portions 106 is formed from an end of the cap portion 104 on the rear-end surface side (an end in the X-axis negative direction) toward the front-end surface side along the direction of providing the through hole 108 of the main unit 102. By thus forming the cutting portions 106 in such a direction, the cutting portions 106 can allow the cap portion 104 to deform toward the side of the main unit 102.

At this time, the length in which the cutting portions 106 are formed is set, as shown in FIG. 3C, to be shorter than the length of the cap portion 104 in the direction of forming the cutting portions 106. That is, the cutting portions 106 are formed in a length shorter than the length of the cap portion 104 from the rear-end surface side to the front-end surface side. When the cutting portions 106 are formed in such a length, adjacent cap pieces 110 are connected to each other at a front-end portion thereof and thus the strength against external force at the front-end portion, i.e., a base portion of the cap pieces 110 with respect to the main unit 102, is increased. As a result, the cap pieces 110 can be prevented from excessively deforming or abnormally overlapping each other and also durability can be improved. The length of the cutting portions 106 may be appropriately adjusted as shown in a second embodiment which will be described below.

The cutting portions 106 are formed in a width in which the space between divided cap pieces 110 expands as it goes toward the rear-end surface side. In other words, an end of each cap piece 110 on the rear-end surface side (X-axis negative direction side) becomes smaller in a substantially arc-shape manner. By creating space between cap pieces 110 in such a width, when the earpiece 100 is placed in the ear canal and contracts, the cap pieces 110 are avoided from being stacked on top of each other more than necessary and thus a portion that abuts the ear canal is flattened, further improving fit.

It is desirable that the material of the cap portion 104 of the earpiece 100 be an elastic material. Further, the main unit 102 may also be an elastic member or may be of other materials. Examples of other materials of the main unit 102 include a plastic member, etc. For the elastic member, it is desirable to use silicon rubber but in addition to this a variety of rubbers, e.g., rubbers containing an epoxy resin, a modified silicon resin, and an urethane resin, can be used. By forming the cap portion 104 using such a material, when the earpiece 100 is placed in the ear canal, the cap portion 104 can contract while providing a moderate repelling force to the ear by its elastic force. Thus, space between the cap portion 104 and the ear canal is less likely to be created, whereby sound leakage can be prevented and fit can be improved.

Figure 4:
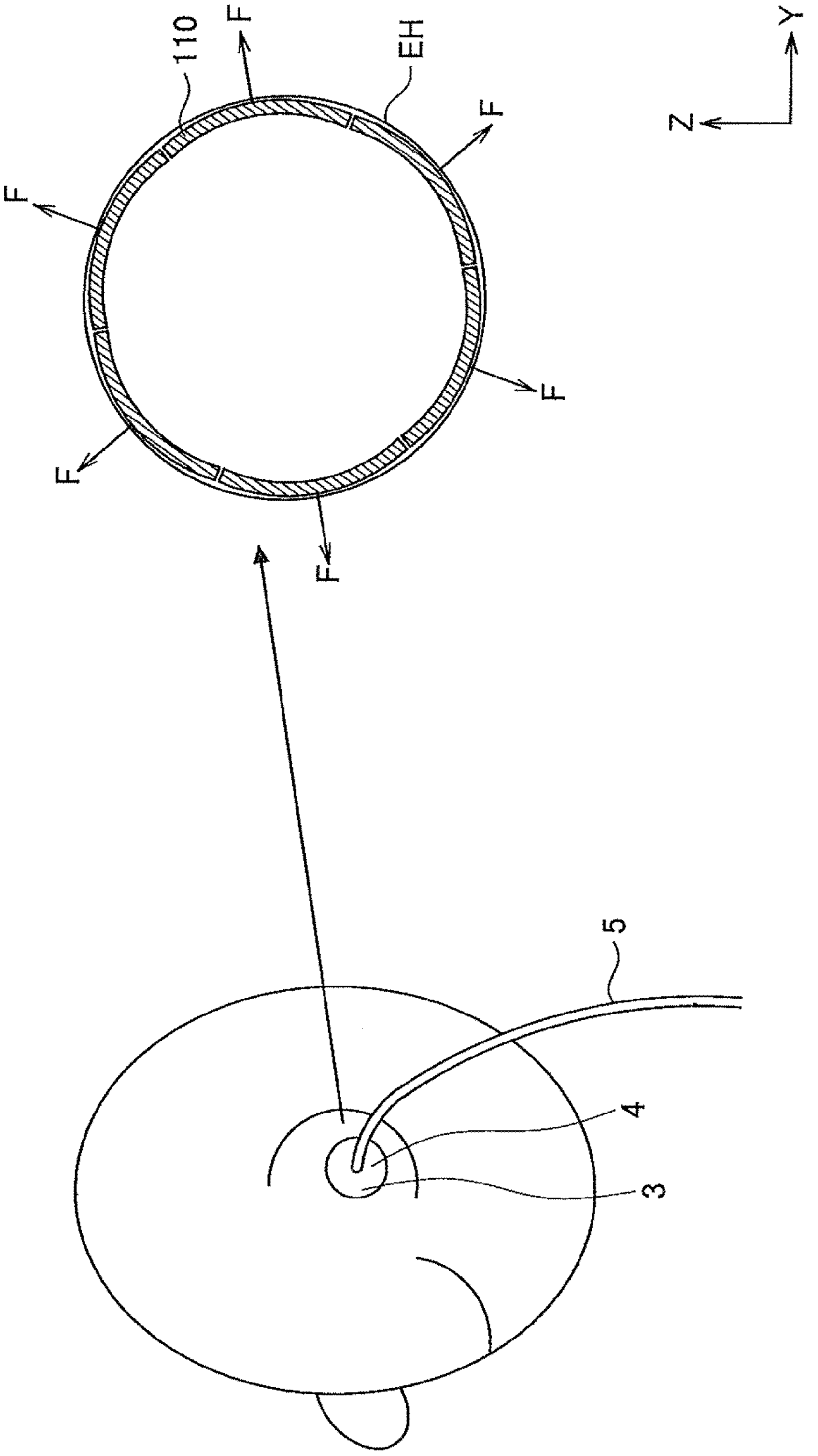
FIG. 4 is an explanatory diagram for describing effects, etc., of the earpiece according to the embodiment.

Next, the deformation state of the earpiece 100 for when a user places the earphone 1 having the earpiece 100 according to the present embodiment will be described with reference to FIGS. 3A to 3D and 4. FIG. 4 is an explanatory diagram for describing effects, etc., of the earpiece 100 according to the present embodiment. Although in FIG. 4 the earpieces 100 are placed in both ears of the user, needless to say, the earpiece 100 may be placed in only one ear.

FIG. 4 is a diagram of a state in which the user places the earphones 1 each including an earpiece 100, as seen from the lateral direction of the user and shows a state in which the earpiece 100 is in contact with an ear canal EH upon the placement. In order that the deformation state of the earpiece 100 can be easily seen, FIG. 4 shows a cross-sectional shape of the plurality of cap pieces 110 of the earpiece 100 on a YZ plane.

As shown in FIG. 4, when the earpiece 100 is inserted into the ear canal EH, the plurality of cap pieces 110 deform toward the side of the main unit 102 and accordingly the earpiece 100 as a whole contracts toward the side of the main unit 102. At this time, as shown in FIG. 4, the space between adjacent cap pieces 110 is narrowed, whereby the cap portion 104 deforms. At this time, each cap piece 110 applies a uniform pressure F to an inner wall surface of the ear canal EH in an outward direction by its moderate elastic force. According to the earpiece 100, the pressures F thus applied to the ear canal EH are uniform and are not unbalanced and thus fit is improved. At this time, according to the earpiece 100, unlike the earpiece 10 according to related art, space is not created between the ear canal EH and the earpiece 100. Accordingly, the earpiece 100 can not only prevent local force from being applied to the ear canal EH but also prevent sound leakage. Such effects can be obtained because the earpiece 100 has the cutting portions 106 and thus can distort according to the size of the ear canal EH and contract uniformly without causing abnormal deformation. At this time, the earpiece 100 can deform uniformly supporting various sizes of the ear canal EH and thus can be applied to various users regardless of the size of the ear canal EH. In addition, when the earpiece 100 thus fits into the ear canal EH, an adjustment, etc., are not particularly required and thus the earpiece 100 can easily enhance fit without causing the user any trouble. Moreover, the earpiece 100 has a shape in which, as shown in FIG. 3B, the cap pieces 110 spread out as they go toward the rear-end surface side (X-axis negative direction). Therefore, friction force acts between ends, on the rear-end surface side (X-axis negative direction side), of the respective cap pieces 110 and the ear canal EH, which makes the earpiece 100 difficult to fall out of the ear canal EH.

The earpiece 100 according to the first embodiment of the present invention is described above. The earpiece 100 is described for the case in which the length of the cutting portions 106 formed in the cap portion 104 is set to be shorter than the length of the cap portion 104 in the direction of forming the cutting portions 106. However, as described above, the length of the cutting portions 106 can be appropriately adjusted. Hence, as an example of the case in which the length of the cutting portions 106 is different than that described above, an earpiece 200 according to a second embodiment will be described next.

(Second Embodiment: an earpiece having cutting portions with deep cuttings)

Figure 5A:
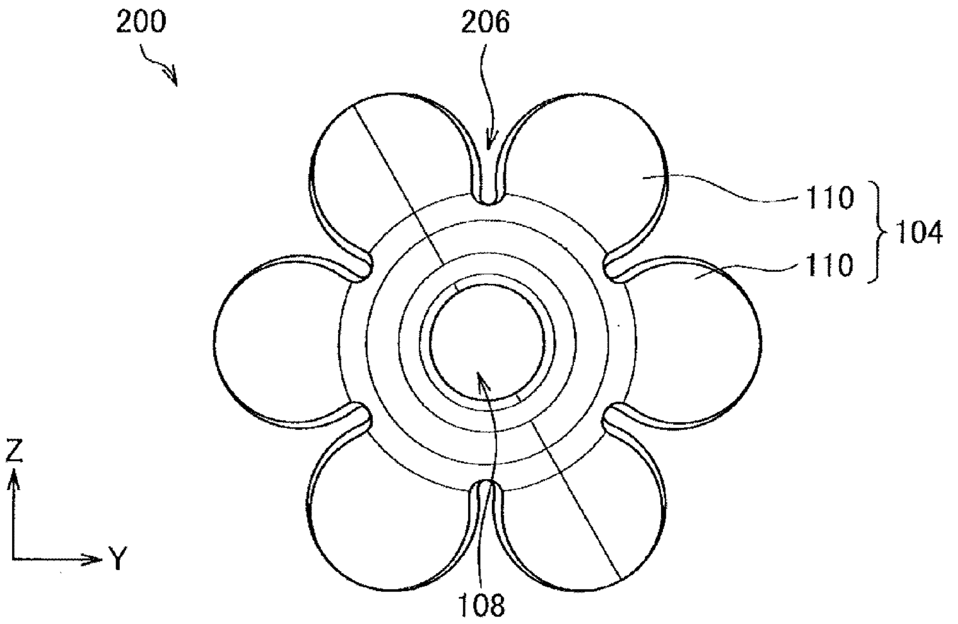
FIG. 5A is an explanatory diagram for describing an earpiece according to a second embodiment of the present invention.
Figure 5B:
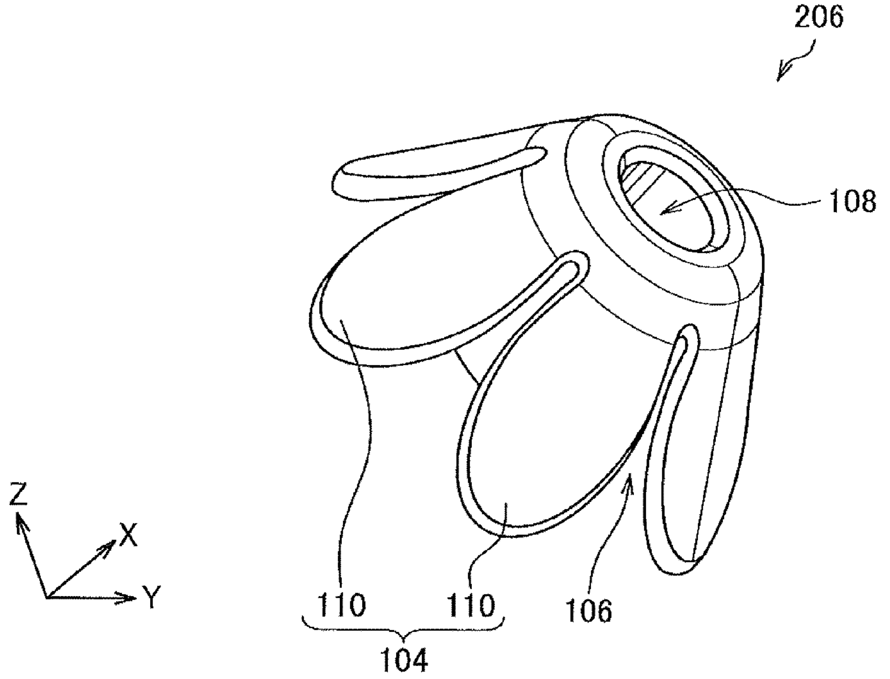
FIG. 5B is an explanatory diagram for describing the earpiece according to the embodiment.
Figure 5C:
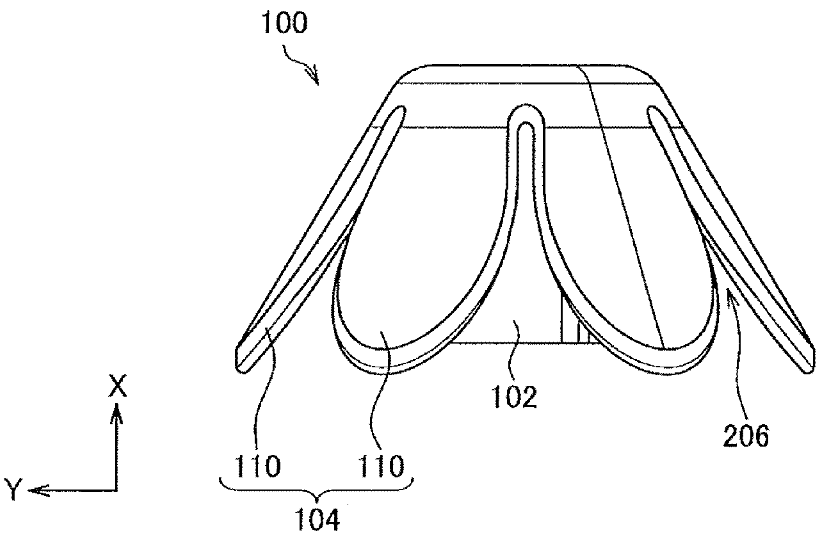
FIG. 5C is an explanatory diagram for describing the earpiece according to the embodiment.
Figure 5D:
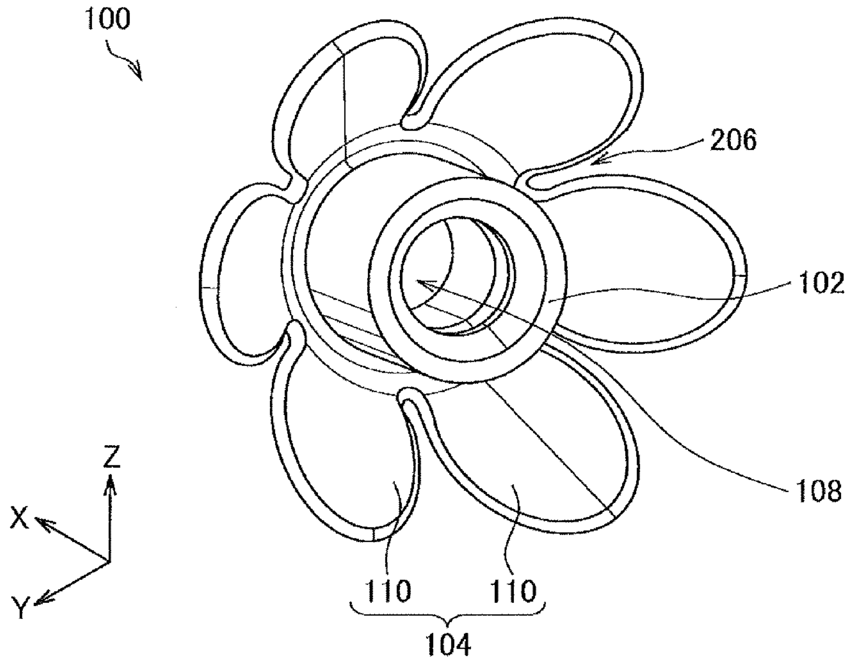
FIG. 5D is an explanatory diagram for describing the earpiece according to the embodiment.

FIGS. 5A to 5D are explanatory diagrams for describing an earpiece according to a second embodiment of the present invention. FIG. 5A is a top view of an earpiece as seen from above (X-axis positive direction) and FIG. 5B is a perspective view of the earpiece as seen from diagonally forward (X-axis positive, Y-axis negative, and Z-axis negative directions). FIG. 5C is a side view of the earpiece as seen from a lateral direction (Z-axis positive direction) and FIG. 5D is a perspective view of the earpiece as seen from diagonally rearward (X-axis negative, Y-axis positive, and Z-axis positive directions).

An earpiece 200 according to the present embodiment is basically configured in the same manner as the earpiece 100 according to the first embodiment, except that the length of cutting portions 206 is different. Therefore, here, the length of the cutting portions 206 will be mainly described and description of components, etc., that overlap those in the first embodiment is omitted.

As shown in FIGS. 5A to 5D, the earpiece 200 according to the present embodiment has cutting portions 206 instead of the cutting portions 106. The cutting portions 206 are basically configured in the same manner as the above-described cutting portions 106 but are different in length than the cutting portions 106.

Specifically, the length in which the cutting portions 206 according to the present embodiment are formed is, as shown in FIG. 5C, set to a length comparable with the length of a cap portion 104 in the direction of forming the cutting portions 206. That is, the cutting portions 206 are formed in substantially the same length as the length of the cap portion 104 from the rear-end surface side to the front-end surface side. In other words, the cutting portions 206 of the cap portion 104 are deeper than the cutting portions 106 according to the first embodiment. The expression “cutting portions are deeper” as used here indicates a state in which the cutting portions 206 extend longer from an end of the cap portion 104 on the rear-end surface side in the front-end surface side direction (X-axis positive direction). When the cutting portions 206 are formed in such a length, although adjacent cap pieces 110 are connected to each other at a front-end portion thereof, the connecting location thereof is limited to near a connecting area at a front-end surface of a main unit 102. As a result, each cap piece 110 can reduce its repelling force against external force (force received from an ear canal EH) that causes the cap piece 110 to deform toward the side of the main unit 102, over the case of the first embodiment. Accordingly, pressures F applied to the ear canal EH can be reduced.

By thus adjusting the length of the cutting portions 206 (or the cutting portions 106), the elastic force of the cap pieces 110 can be adjusted. When, as in the first embodiment, the length of the cutting portions 206 is shorter than the length of the cap portion 104, the strength of a base portion of the cap pieces 110 can be strengthened and thus durability can be improved while abnormal overlapping between the cap pieces 110 is prevented.

The earpiece 200 according to the second embodiment of the present invention is described above. The case of the earpiece 200 according to the second embodiment, too, as with the earpiece 100 shown in FIG. 4, the cap pieces 110 deform toward the side of the main unit 102, whereby uniform, moderate pressures F are applied to the ear canal EH, improving fit. In the earpieces 100 and 200 according to the first and second embodiments, when the size of the ear canal EH is small, adjacent cap pieces 110 overlap with their edge portions. However, since the cap pieces 110 appropriately contract, the pressures F are maintained uniform and thus fit is not impaired. However, the degree of overlapping between the cap pieces 110 can also be controlled regardless of the size of the ear canal EH. As an example in which the degree of overlapping between the cap pieces 110 is controllable, an earpiece 300 according to a third embodiment of the present invention will be described next.

(Third Embodiment: an earpiece having cap pieces which more easily overlap each other)

Figure 6A:
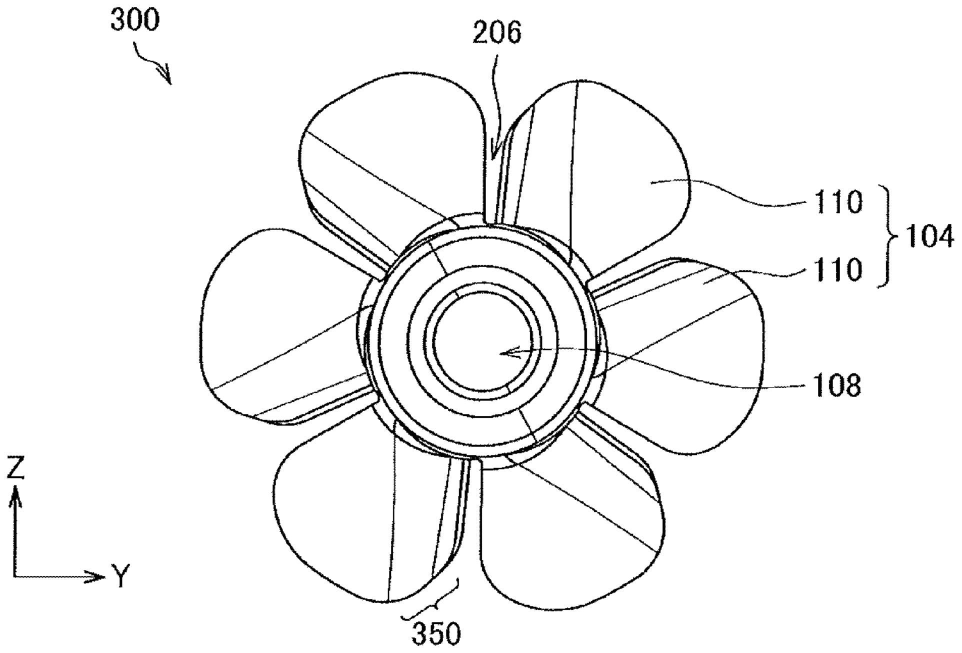
FIG. 6A is an explanatory diagram for describing an earpiece according to a third embodiment of the present invention.
Figure 6B:
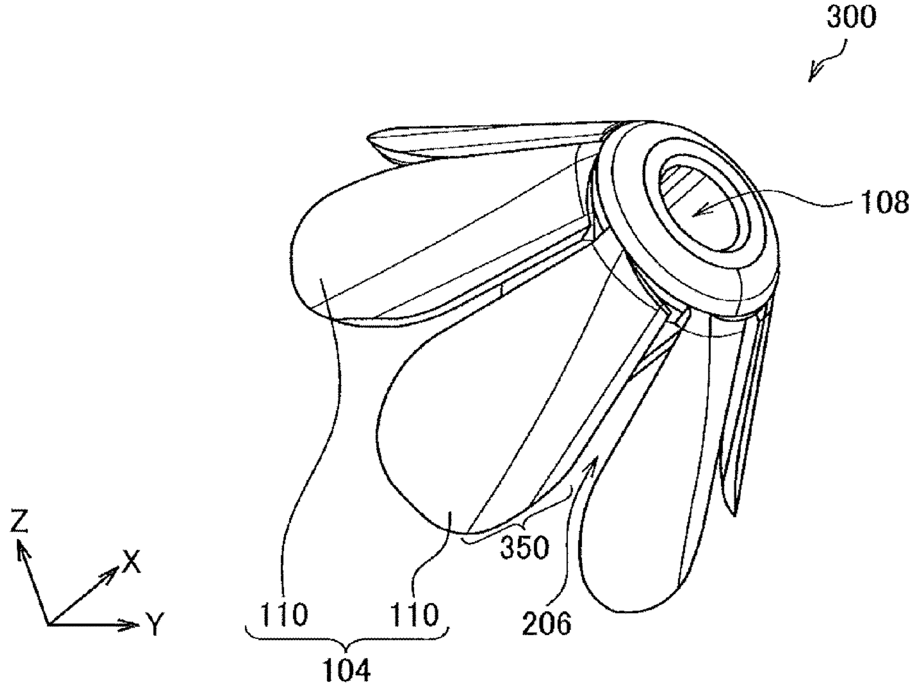
FIG. 6B is an explanatory diagram for describing the earpiece according to the embodiment.
Figure 6C:
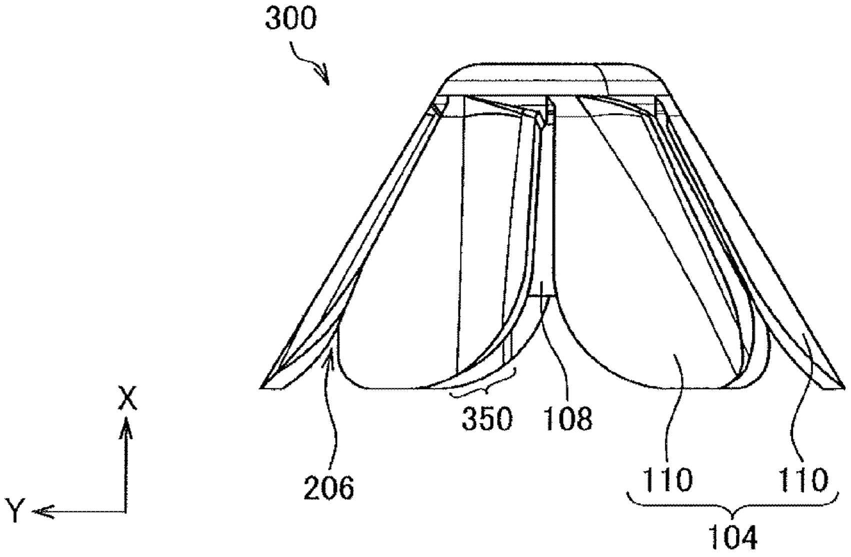
FIG. 6C is an explanatory diagram for describing the earpiece according to the embodiment.
Figure 6D:
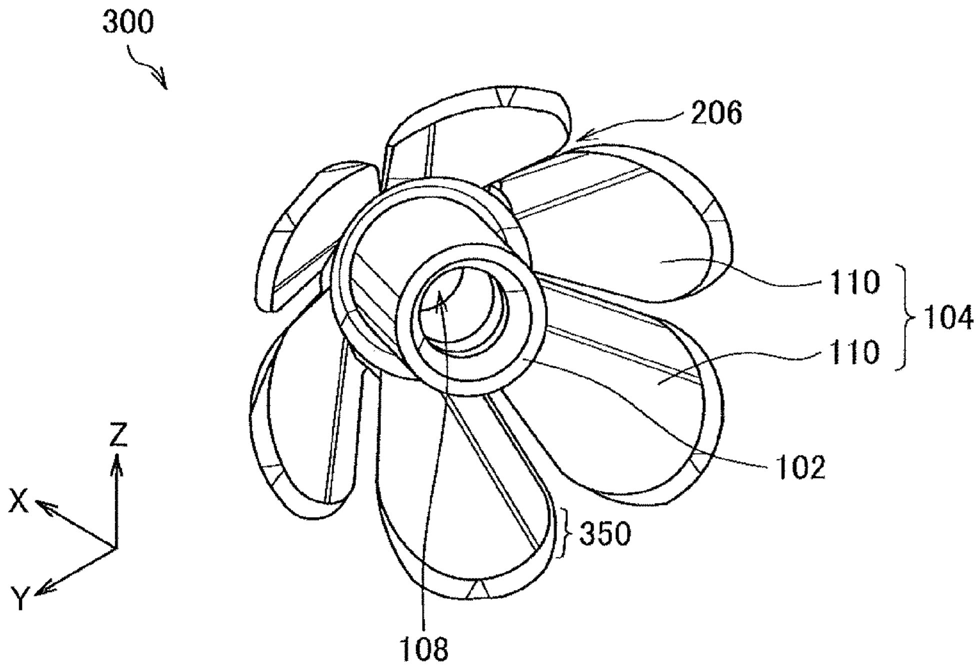
FIG. 6D is an explanatory diagram for describing the earpiece according to the embodiment.

FIGS. 6A to 6D are explanatory diagrams for describing an earpiece according to a third embodiment of the present invention. FIG. 6A is a top view of an earpiece as seen from above (X-axis positive direction) and FIG. 6B is a perspective view of the earpiece as seen from diagonally forward (X-axis positive, Y-axis negative, and Z-axis negative directions). FIG. 6C is a side view of the earpiece as seen from a lateral direction (Z-axis positive direction) and FIG. 6D is a perspective view of the earpiece as seen from diagonally rearward (X-axis negative, Y-axis positive, and Z-axis positive directions).

An earpiece 300 according to the present embodiment has extension cap pieces 350. The earpiece 300 is configured in the same manner as the earpiece 200 according to the second embodiment, except that the earpiece 300 has the extension cap pieces 350. Therefore, here, the extension cap pieces 350 will be mainly described and description of components, etc., that overlap those in the first and second embodiments is omitted.

As shown in FIGS. 6A to 6D, the earpiece 300 according to the present embodiment has the extension cap pieces 350. The extension cap pieces 350 each indicate, as shown in FIG. 6C, a cap piece formed to extend from one cap piece 110 toward another cap piece 110. In other words, each extension cap piece 350 may be, on one side of a cap piece 110, an edge portion on the side of another cap piece 110 but here description is made assuming that an extension cap piece 350 and a cap piece 110 where the extension cap piece 350 is formed have different configurations. An extension cap piece 350 is formed to extend to a cutting portion 206 and thus covers a part of the cutting portion 206. In other words, each cap piece 110 extends in the direction of a corresponding cutting portion 206 (Y-axis positive direction) and thus the space between cap pieces 110 is narrowed. The thickness of each extension cap piece 350 decreases as it goes farther away from a corresponding cap piece 110. In other words, each extension cap piece 350 becomes thinner as it goes in the direction of a corresponding cutting portion 206 (Y-axis positive direction) from a corresponding cap piece 110.

Figure 7:
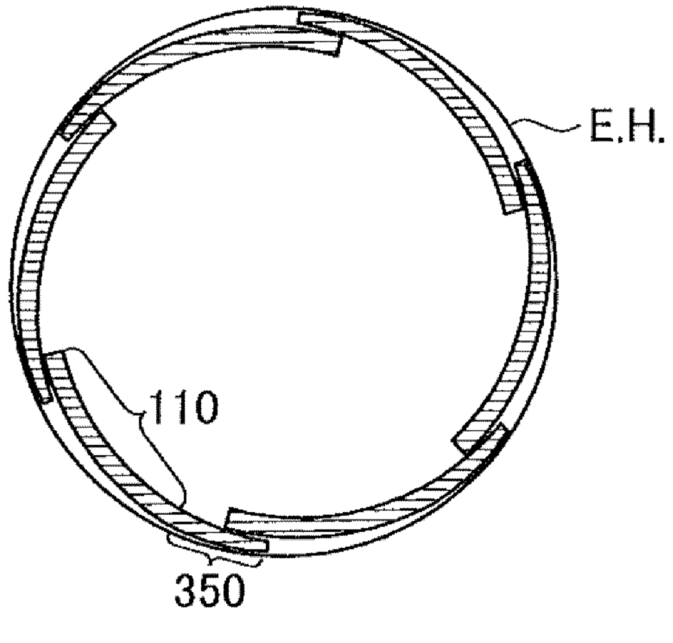
FIG. 7 is an explanatory diagram for describing effects, etc., of the earpiece according to the embodiment.

FIG. 7 is an explanatory diagram showing a state in which the cap pieces 110 of the earpiece 300 are placed in an ear canal EH. Unlike the earpiece 100 according to the first embodiment which is described with reference to FIG. 4, the earpiece 300 has the extension cap pieces 350 and thus when the earpiece 300 contracts in the ear canal EH, the cap pieces 110 easily overlap each other.

The earpiece 300 according to the present embodiment has the extension cap pieces 350 and thus when the earpiece 300 is placed in the ear, space is less likely to be created between the ear canal EH and the earpiece 300 and accordingly sound leakage is less likely to occur. Furthermore, the thickness of each extension cap piece 350 decreases as it goes farther away from the above-described one cap piece 110. Thus, when a cap portion 104 deforms in the direction of a main unit 102, i.e., when the cap portion 104 is placed in the ear canal EH and contracts, the thickness of a portion where an extension cap piece 350 overlaps the above-described other cap piece 110 does not become thick and thus high quality of sound delivered to the ear is guaranteed. When the earpiece 300 is placed in the ear canal EH and contracts, an extension cap piece 350 may come on the top of the above-described other cap piece 110 or may come under the above-described other cap piece 110.

The shapes, materials, etc., of components other than the extension cap pieces 350 of the earpiece 300 may be those of the earpiece 100 described with reference to the first embodiment or may be those of the earpiece 200 described with reference to the second embodiment.

By thus providing the extension cap pieces 350, the degree of overlapping between the cap pieces 110 can be adjusted. In addition, since the thickness of each extension cap piece 350 decreases as it goes farther away from a corresponding cap piece 110, even when the extension cap piece 350 overlaps another cap piece 110, the thickness of the overlapping portion does not become thick more than necessary and thus high quality of sound is also guaranteed.

The earpiece 300 according to the third embodiment of the present invention is described above. In the case of the earpiece 300 according to the third embodiment, too, as with the earpiece 100 according to the first embodiment and the earpiece 200 according to the second embodiment, the cap pieces 110 deform toward the side of the main unit 102, whereby uniform, moderate pressures F are applied to the ear canal EH, improving fit. The earpiece 300 according to the third embodiment has the extension cap pieces 350, which enables to control the degree of overlapping between the cap pieces 110. However, the degree of overlapping between the cap pieces 110 can also be controlled by providing connecting films 450 that connect the cap pieces 110 divided by the cutting portions 206 (or the cutting portions 106). Next, as an example in which the degree of overlapping between the cap pieces 110 is controlled by providing the connecting films 450, an earpiece 400 according to a fourth embodiment of the present invention will be described.

(Fourth Embodiment: an earpiece with connecting films)

Figure 8A:
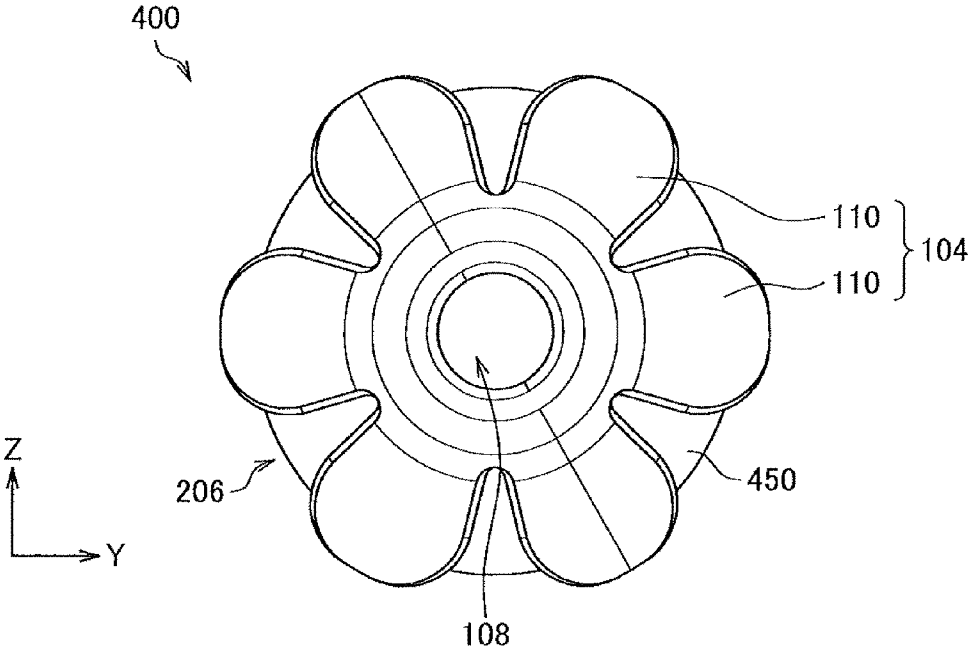
FIG. 8A is an explanatory diagram for describing an earpiece according to a fourth embodiment of the present invention.
Figure 8B:
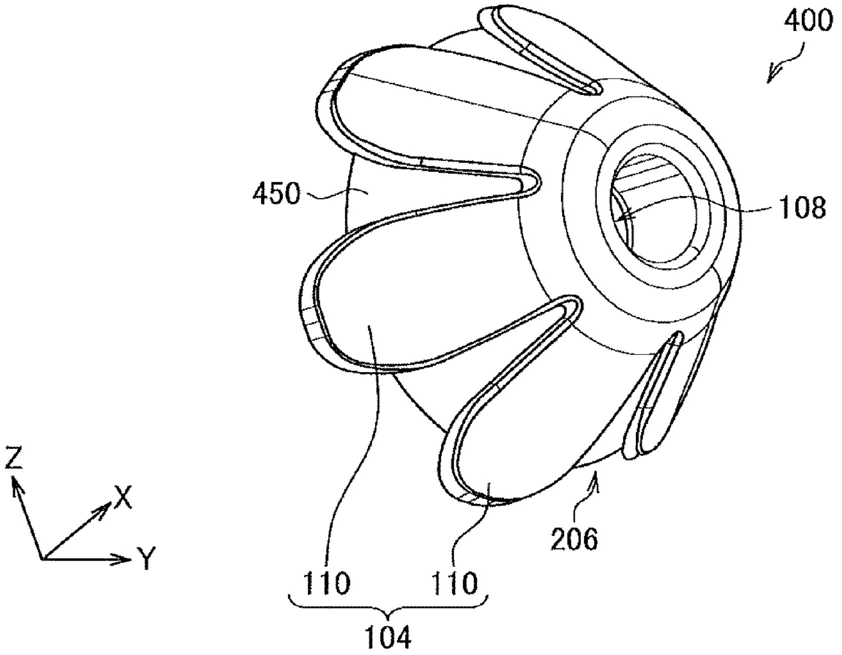
FIG. 8B is an explanatory diagram for describing the earpiece according to the embodiment.
Figure 8C:
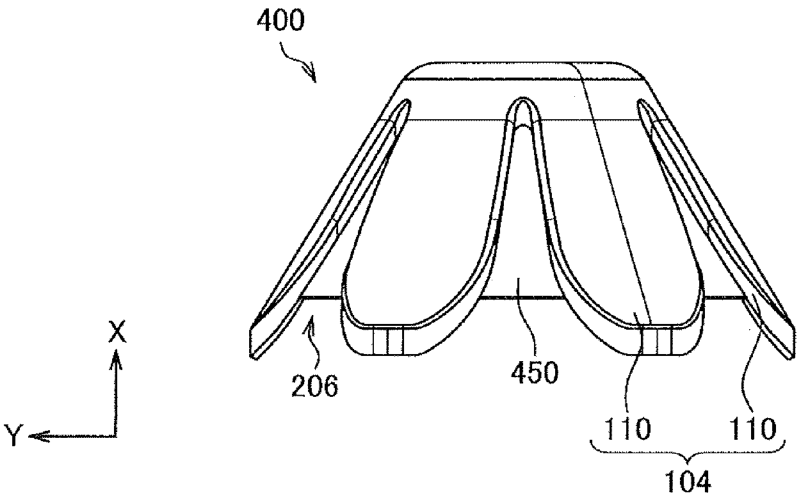
FIG. 8C is an explanatory diagram for describing the earpiece according to the embodiment.
Figure 8D:
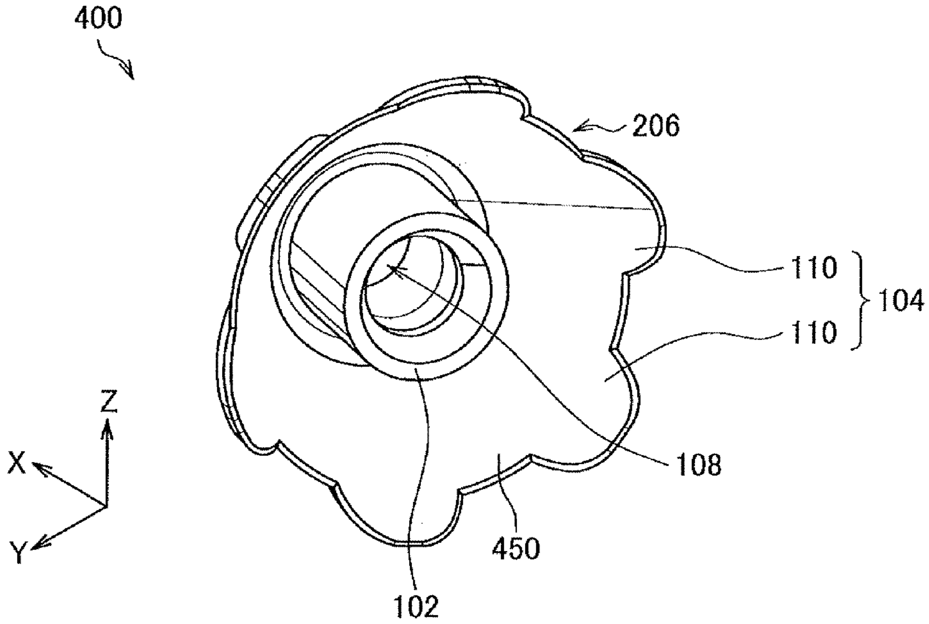
FIG. 8D is an explanatory diagram for describing the earpiece according to the embodiment.

FIGS. 8A to 8D are explanatory diagrams for describing an earpiece according to a fourth embodiment of the present invention. FIG. 8A is a top view of an earpiece as seen from above (X-axis positive direction) and FIG. 8B is a perspective view of the earpiece as seen from diagonally forward (X-axis positive, Y-axis negative, and Z-axis negative directions). FIG. 8C is a side view of the earpiece as seen from a lateral direction (Z-axis positive direction) and FIG. 8D is a perspective view of the earpiece as seen from diagonally rearward (X-axis negative, Y-axis positive, and Z-axis positive directions).

An earpiece 400 according to the present embodiment has connecting films 450. The earpiece 400 is configured in the same manner as the earpiece 200 according to the second embodiment, except that the earpiece 400 has the connecting films 450. Therefore, here, the connecting films 450 will be mainly described and description of components, etc., that overlap those in the first and second embodiments is omitted.

The earpiece 400 according to the present embodiment has the connecting films 450, each of which connects two cap pieces 110 divided by a cutting portion 206 (or cutting portion 106). The connecting films 450 are formed in their corresponding cutting portions 206, to a thickness thinner than a cap portion 104. The connecting films 450 may be of the same material as the cap pieces 110 or may be of a material that provides easy fabrication with a thin thickness. For example, the material may be silicon rubber as with the cap pieces 110 or may be urethane rubber which has strong tensile strength even when it is thin.

Since the earpiece 400 thus has the connecting films 450 in areas where the cutting portions 206 are present, when the earpiece 400 contracts in an ear canal EH, space is less likely to be created. In addition, since the thickness is thin, the connecting films 450 more easily distort than the cap pieces 110 in terms of deformation in the direction of a main unit 102. Moreover, since the earpiece 400 has the connecting films 450, deformation of the divided cap pieces 110 is more accurately controlled. In other words, the direction in which the earpiece 400 shrinks when contracting in the ear canal EH is controlled. Since cap pieces 110 are connected to each other through a connecting film 450 and the cap pieces 110 deform in conjunction with one another, for example, one cap piece 110 is less likely to overlap another cap piece 110 adjacent thereto. From this point of view, too, space is less likely to be created between the earpiece 400 and the ear canal EH.

The shapes, materials, etc., of components other than the connecting films 450 of the earpiece 400 may be any of those of the earpiece 100, etc., described with reference to the first to third embodiments.

The earpiece 400 according to the fourth embodiment of the present invention is descried above. In the case of the earpiece 400 according to the fourth embodiment, too, as with the earpiece 100, etc., according to the first to third embodiments, the cap pieces 110 deform toward the side of the main unit 102, whereby uniform, moderate pressures F are applied to the ear canal EH, improving fit. The earpiece 400 according to the fourth embodiment has the connecting films 450, which enables to control the degree of overlapping between the cap pieces 110. It is desirable that when the earpiece 400 is placed in the ear canal EH the connecting films 450 contract to the center side of the ear canal EH. Next, as an example of connecting films 550 that easily contract to the center side of the ear canal EH, an earpiece 500 according to a fifth embodiment of the present invention will be described.

(Fifth Embodiment: an earpiece with folds)

Figure 9A:
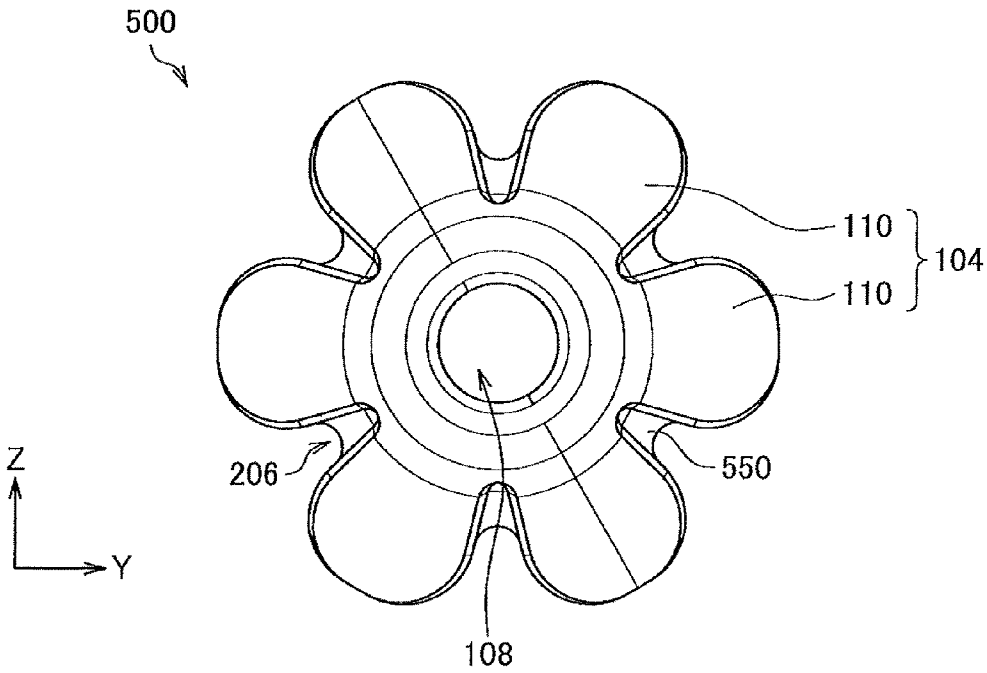
FIG. 9A is an explanatory diagram for describing an earpiece according to a fifth embodiment of the present invention.
Figure 9B:
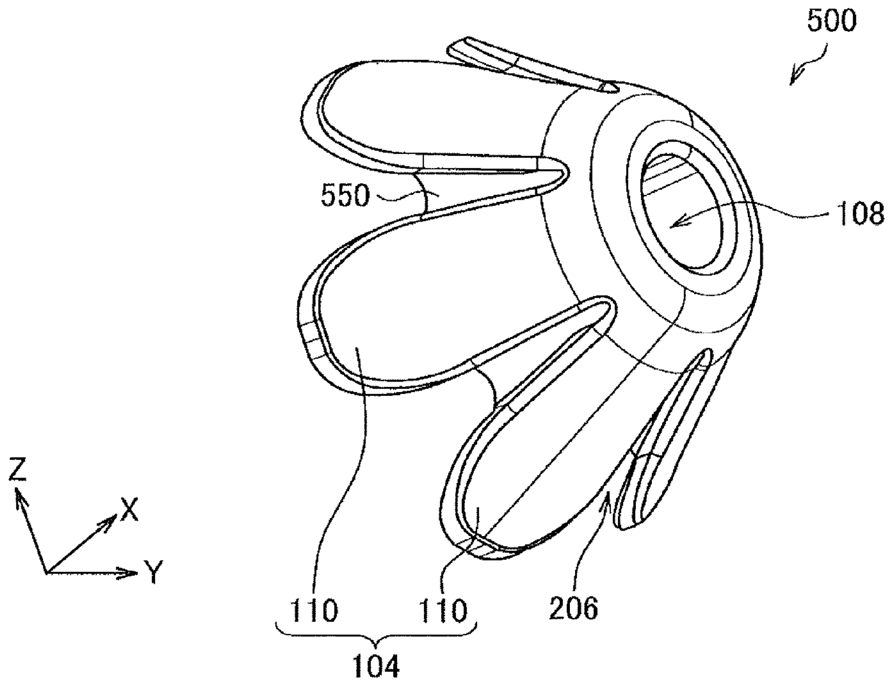
FIG. 9B is an explanatory diagram for describing the earpiece according to the embodiment.
Figure 9C:
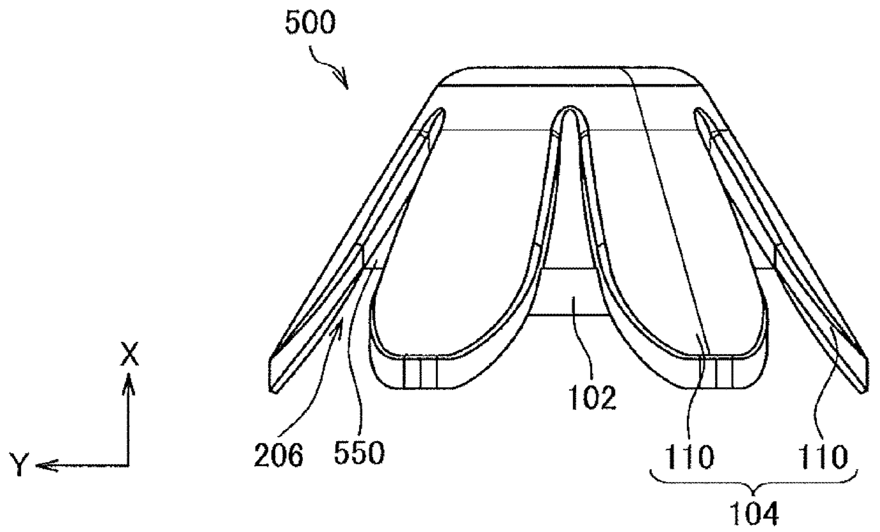
FIG. 9C is an explanatory diagram for describing the earpiece according to the embodiment.
Figure 9D:
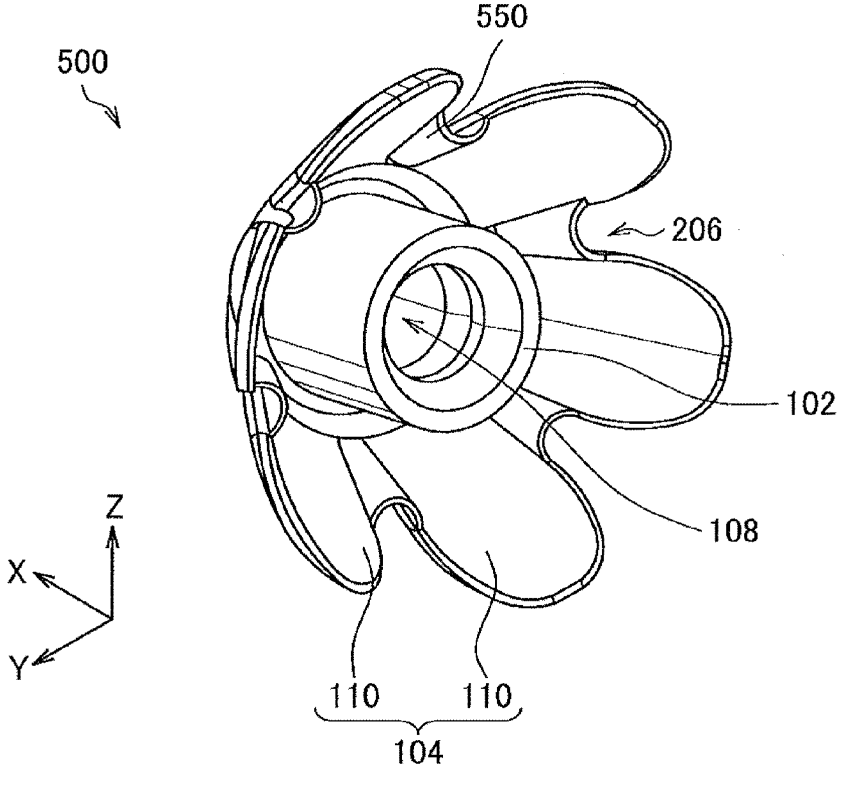
FIG. 9D is an explanatory diagram for describing the earpiece according to the embodiment.

FIGS. 9A to 9D are explanatory diagrams for describing an earpiece according to a fifth embodiment of the present invention. FIG. 9A is a top view of an earpiece as seen from above (X-axis positive direction) and FIG. 9B is a perspective view of the earpiece as seen from diagonally forward (X-axis positive, Y-axis negative, and Z-axis negative directions). FIG. 9C is a side view of the earpiece as seen from a lateral direction (Z-axis positive direction) and FIG. 9D is a perspective view of the earpiece as seen from diagonally rearward (X-axis negative, Y-axis positive, and Z-axis positive directions).

An earpiece 500 according to the present embodiment has connecting films 550. The earpiece 500 is configured in the same manner as the earpiece 200 according to the second embodiment, except that the earpiece 500 has the connecting films 550. Therefore, here, the connecting films 550 will be mainly described and description of components, etc., that overlap those in the first and second embodiments is omitted.

The connecting films 550 of the earpiece 500 according to the present embodiment are fold-like films. The word "fold-like" as used here indicates, as shown in FIG. 9D, a state of bending toward the side of a main unit 102. Since the connecting films 550 are provided in areas where cutting portions 206 are present, when the earpiece 500 contracts in an ear canal EH, space is less likely to be created. In addition, since the thickness is thin, the connecting films 550 more easily distort than cap pieces 110 in terms of deformation in the direction of the main unit 102. Furthermore, since the connecting films 550 bend toward the side of the main unit 102, when the earpiece 500 contracts in the ear canal EH, the connecting films 550 easily deform toward the side of the main unit 102 (the center side of the earpiece 500).

Since the connecting films 550 thus bend toward the side of the main unit 102, when the earpiece 500 contracts in the ear canal EH, the connecting films 550 deform toward the side of the main unit 102 and thus no pressure from the connecting films 550 is applied to the ear canal EH. Hence, a load is less likely to be applied to the ear canal EH. In addition, as described above based on the earpiece 400 according to the fourth embodiment, providing the connecting films 550 makes space less likely to be created between the earpiece 500 and the ear canal EH.

The shapes, materials, etc., of components other than the connecting films 550 of the earpiece 500 according to the present embodiment may be any of those of the earpiece 100, etc., described with reference to the first to fourth embodiments. Furthermore, the connecting films 550 of the earpiece 500 according to the present embodiment have the same configuration as the connecting films 450 of the earpiece 400 according to the fourth embodiment, except that the connecting films 550 bend toward the side of the main unit 102.

The earpiece 500 according to the fifth embodiment of the present invention is described above. In the case of the earpiece 500 according to the fifth embodiment, too, as with the earpiece 100, etc., according to the first to fourth embodiments, the cap pieces 110 deform toward the side of the main unit 102, whereby uniform, moderate pressures F are applied to the ear canal EH, improving fit. Furthermore, by controlling deformation of the cap pieces 110 toward the side of the main unit 102, the pressures F applied to the ear canal EH are more stabilized, which also enables to improve fit. As an example in which deformation of the cap pieces 110 in the direction of the main unit 102 can be controlled, an earpiece 600 according to a sixth embodiment of the present invention will be described next.

(Sixth Embodiment: an earpiece with ribs provided on the back side of a cap portion)

Figure 10A:
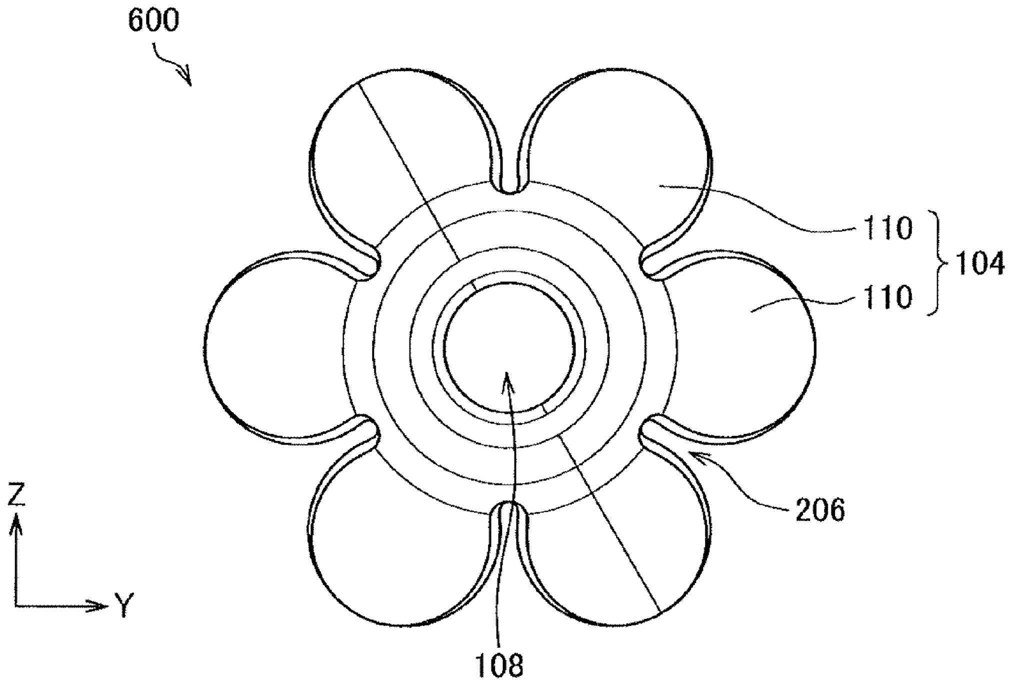
FIG. 10A is an explanatory diagram for describing an earpiece according to a sixth embodiment of the present invention.
Figure 10B:
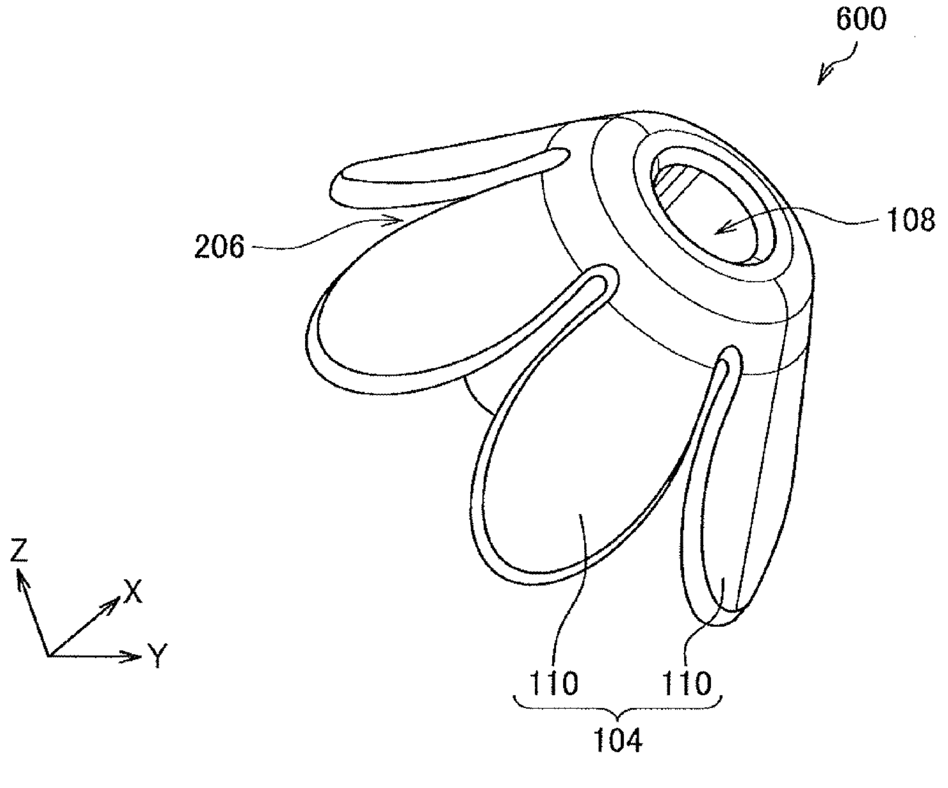
FIG. 10B is an explanatory diagram for describing the earpiece according to the embodiment.
Figure 10C:
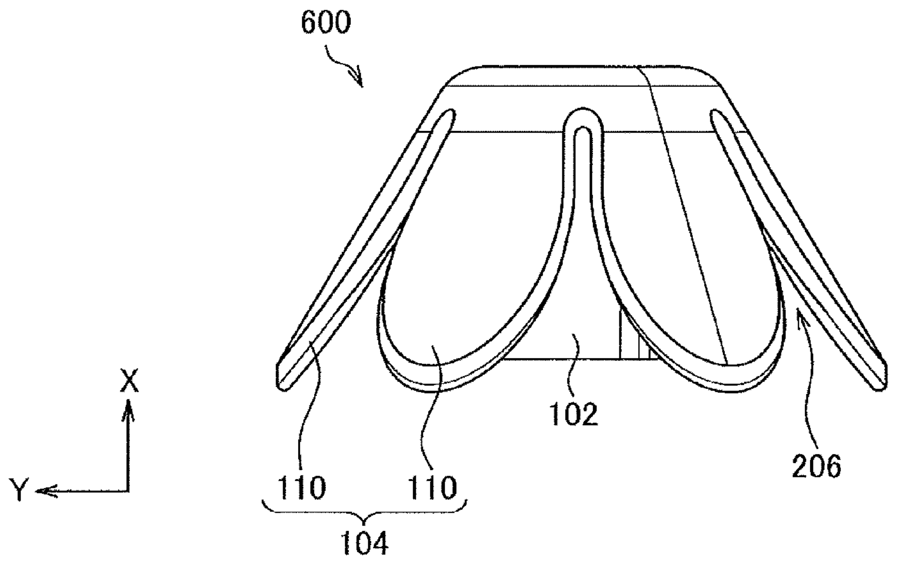
FIG. 10C is an explanatory diagram for describing the earpiece according to the embodiment.
Figure 10D:
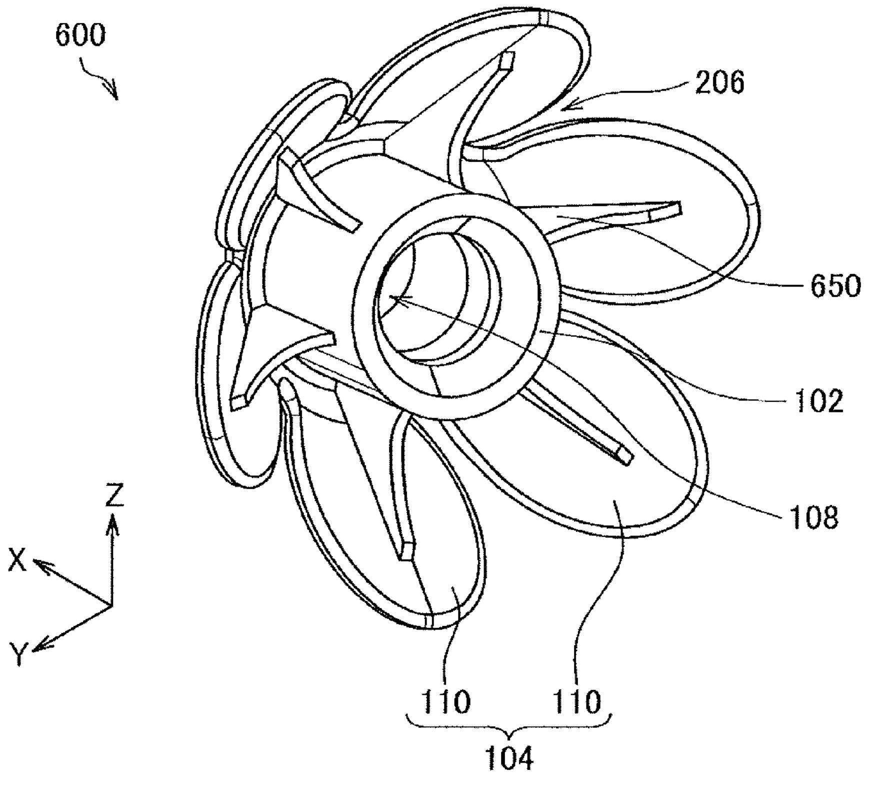
FIG. 10D is an explanatory diagram for describing the earpiece according to the embodiment.

FIGS. 10A to 10D are explanatory diagrams for describing an earpiece according to a sixth embodiment of the present invention. FIG. 10A is a top view of an earpiece as seen from above (X-axis positive direction) and FIG. 10B is a perspective view of the earpiece as seen from diagonally forward (X-axis positive, Y-axis negative, and Z-axis negative directions). FIG. 10C is a side view of the earpiece as seen from a lateral direction (Z-axis positive direction) and FIG. 10D is a perspective view of the earpiece as seen from diagonally rearward (X-axis negative, Y-axis positive, and Z-axis positive directions).

An earpiece 600 according to the present embodiment has supporting portions 650, as shown in FIG. 10D. The earpiece 600 is configured in the same manner as the earpiece 200 according to the second embodiment, except that the earpiece 600 has the supporting portions 650. Therefore, here, the supporting portions 650 will be mainly described and description of components, etc., that overlap those in the first and second embodiments is omitted.

The supporting portions 650 of the earpiece 600 according to the present embodiment are present between a main unit 102 and a cap portion 104 and near a connecting location of a front-end surface of the main unit 102 to the cap portion 104. The "near a connecting location" may be a location that is closest to the connecting location of the main unit 102 to the cap portion 104 or may be a location spaced somewhat from the connecting location of the main unit 102 to the cap portion 104. The supporting portions 650 have a shape supporting the cap portion 104 and act as ribs. As shown in FIG. 10D, the supporting portions 650 are present at respective cap pieces 110 but are not necessarily need to be present at the respective cap pieces 110. A supporting portion 650 may be present at only one cap piece 110 or supporting portions 650 may be present at every other cap piece 110. The supporting portions 650 are disposed at locations that do not overlap the locations of cutting portions 206. The supporting portions 650 may be of the same material as the cap pieces 110 or may be of a material having a large elastic force. For example, the material may be silicon rubber as with the cap pieces 110 or may be urethane rubber having a large elastic force.

As such, the supporting portions 650 can strengthen the elastic forces of the cap pieces 110. By strengthening the elastic forces of the cap pieces 110, pressure applied to an ear canal EH increases. In other words, when a user places the earpiece 600 in the ear canal EH, the cap portion 104 contracts while providing a repelling force to the ear canal EH by its elastic force. As a result, space is less likely to be created between the earpiece 600 and the ear canal EH and thus there is no sound leakage and accordingly the user can obtain good fit.

The shapes, materials, etc., of components other than the supporting portions 650 of the earpiece 600 according to the present embodiment may be those of the earpiece 100, etc., according to the first to fifth embodiments.

The earpiece 600 according to the sixth embodiment of the present invention is descried above. In the case of the earpiece 600 according to the sixth embodiment, too, as with the earpiece 100, etc., according to the first to fifth embodiments, the cap pieces 110 deform toward the side of the main unit 102, whereby uniform, moderate pressures F are applied to the ear canal EH, improving fit. The earpiece 600 according to the sixth embodiment has the supporting portions 650, which enables more stable control of the cap pieces 110 in the direction of the main unit 102. Although, in the earpiece 100, etc., according to the first to sixth embodiments which have been described so far, the cap pieces 110 all have the same size, the size does not need to be the same for all the cap pieces 110. Next, as an example in which cap pieces have different sizes, an earpiece 700 according to a seventh embodiment of the present invention will be described.

(Seventh Embodiment: an earpiece having cap pieces with different sizes)

Figure 11A:
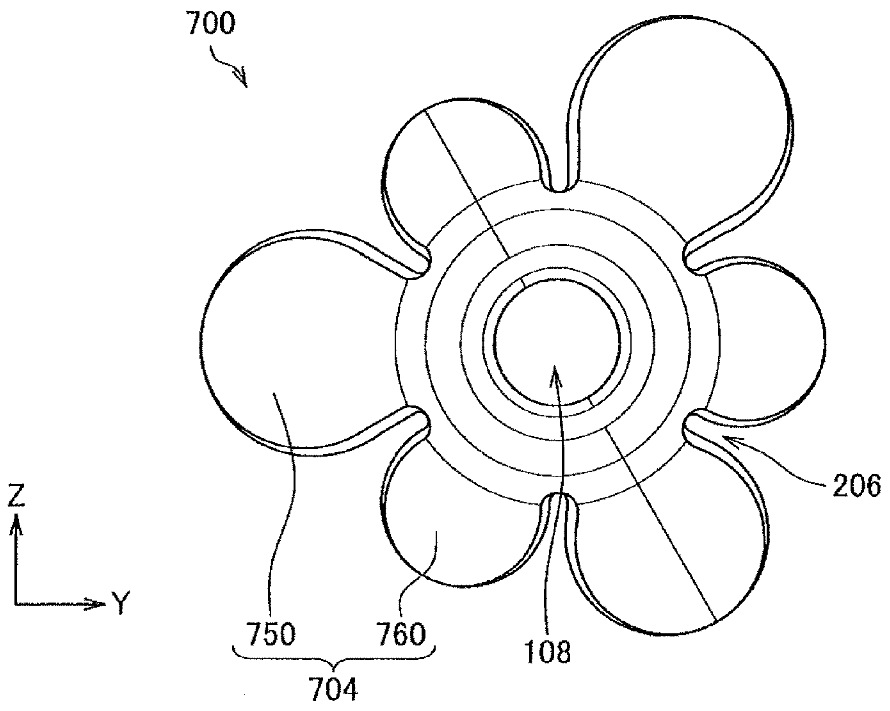
FIG. 11A is an explanatory diagram for describing an earpiece according to a seventh embodiment of the present invention.
Figure 11B:
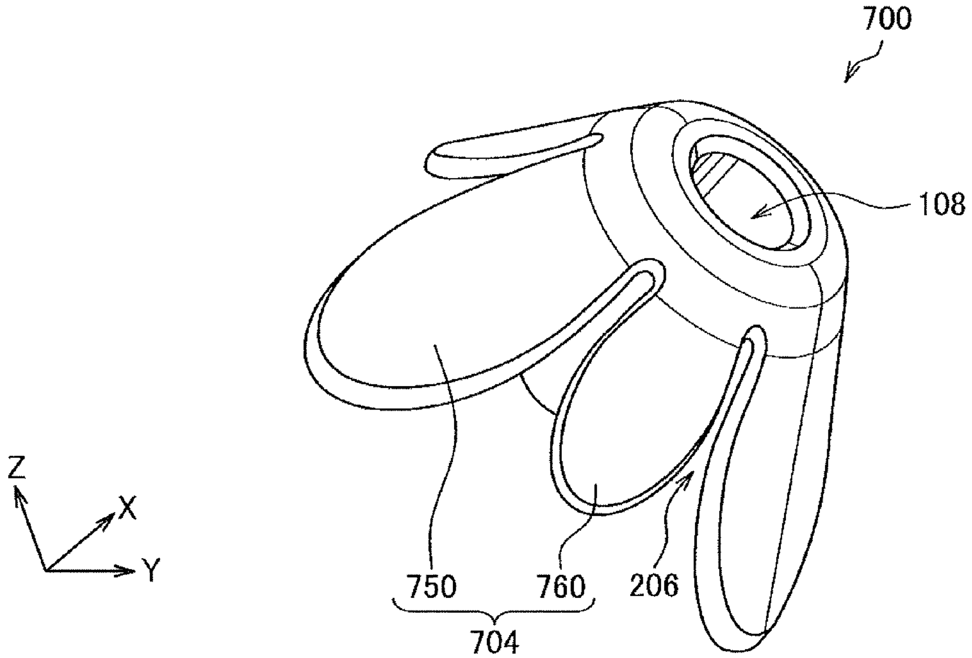
FIG. 11B is an explanatory diagram for describing the earpiece according to the embodiment.
Figure 11C:
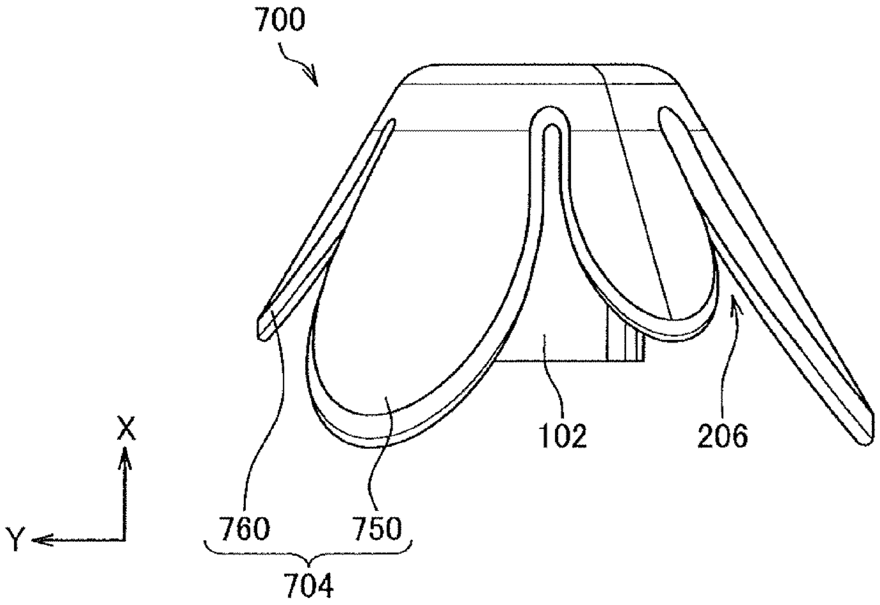
FIG. 11C is an explanatory diagram for describing the earpiece according to the embodiment.
Figure 11D:
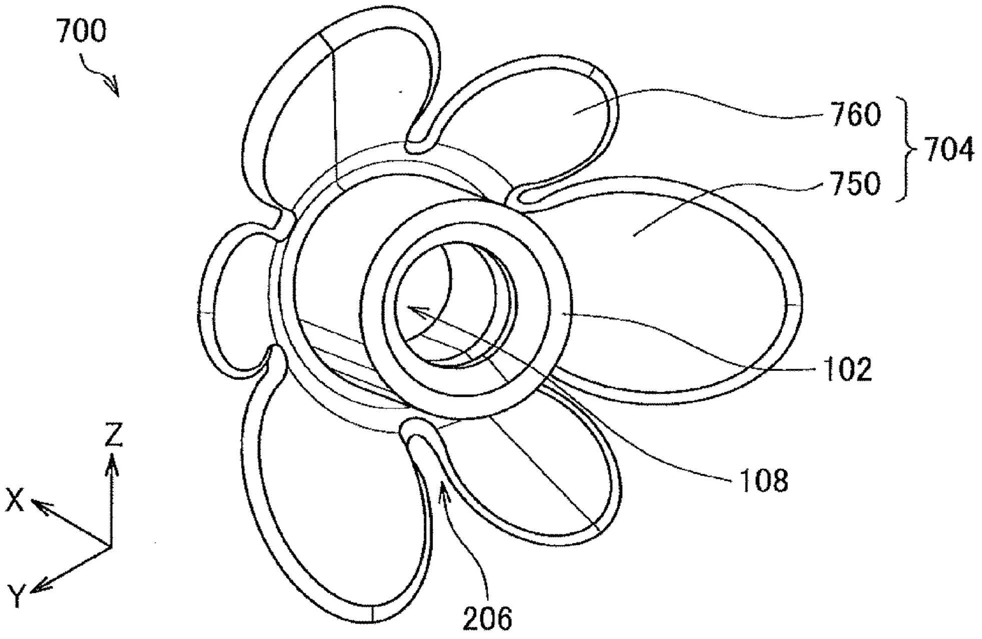
FIG. 11D is an explanatory diagram for describing the earpiece according to the embodiment.

FIGS. 11A to 11D are explanatory diagrams for describing an earpiece according to a seventh embodiment of the present invention. FIG. 11A is a top view of an earpiece as seen from above (X-axis positive direction) and FIG. 11B is a perspective view of the earpiece as seen from diagonally forward (X-axis positive, Y-axis negative, and Z-axis negative directions). FIG. 11C is a side view of the earpiece as seen from a lateral direction (Z-axis positive direction) and FIG. 11D is a perspective view of the earpiece as seen from diagonally rearward (X-axis negative, Y-axis positive, and Z-axis positive directions).

An earpiece 700 according to the present embodiment has a cap portion 704. The cap portion 704 has, as shown in FIG. 11A, larger cap pieces 750 and smaller cap pieces 760. The earpiece 700 is configured in the same manner as the earpiece 200 according to the second embodiment, except that the earpiece 700 has, instead of the cap portion 104, the cap portion 704 including the larger cap pieces 750 and the smaller cap pieces 760. Therefore, here, the cap portion 704 including the larger cap pieces 750 and the smaller cap pieces 760 will be mainly described and description of components, etc., that overlap those in the first and second embodiments is omitted.

The cap portion 704 of the earpiece 700 according to the present embodiment has cap pieces having different sizes, i.e., the larger cap pieces 750 and the smaller cap pieces 760. The larger cap pieces 750 and the smaller cap pieces 760 are disposed alternately. When the earpiece 700 contracts in an ear canal EH, the larger cap pieces 750 overlap one another. The smaller cap pieces 760 deform so as not to create space between the larger cap pieces 750.

By thus disposing the larger cap pieces 750 and the smaller cap pieces 760 alternately, the smaller cap pieces 760 can act to prevent the larger cap pieces 158 from making unwanted move. Specifically, in order that when the larger cap pieces 750 deform in the direction of a main unit 102 the larger cap pieces 750 do not overlap one another too much, the smaller cap pieces 760 can prevent the larger cap pieces 750 from deforming in directions other than the direction of the main unit 102 (the direction of the center of the earpiece 700). That is, the smaller cap pieces 760 can serve as supporting portions for the larger cap pieces 750.

The shapes, materials, etc., of components other than the cap portion 704 of the earpiece 700 may be those of the earpiece 100, etc., according to the first to sixth embodiments.

The earpiece 700 according to the seventh embodiment of the present invention is described above. In the case of the earpiece 700 according to the seventh embodiment, too, as with the earpiece 100, etc., according to the first to sixth embodiments, the cap pieces 750 and 760 deform toward the side of the main unit 102, whereby uniform, moderate pressures F are applied to the ear canal EH, improving fit. In the earpiece 700 according to the seventh embodiment, since the cap pieces 750 and 760 of different sizes are disposed alternately, the cap portion 704 can stably deform in the direction of the main unit 102. However, an example in which the sizes of the cap pieces 750 and 760 differ from cap piece to cap piece is not limited to the cap pieces 750 and 760 of the earpiece 700 according to the present embodiment. Namely, the cap pieces 750 and 760 can take random sizes and shapes. Next, as another example in which a cap piece 862, etc., have different sizes, an earpiece 800 according to an eighth embodiment of the present invention will be described.

(Eighth Embodiment: an earpiece having cap pieces whose sizes are larger on one side)

Figure 12A:
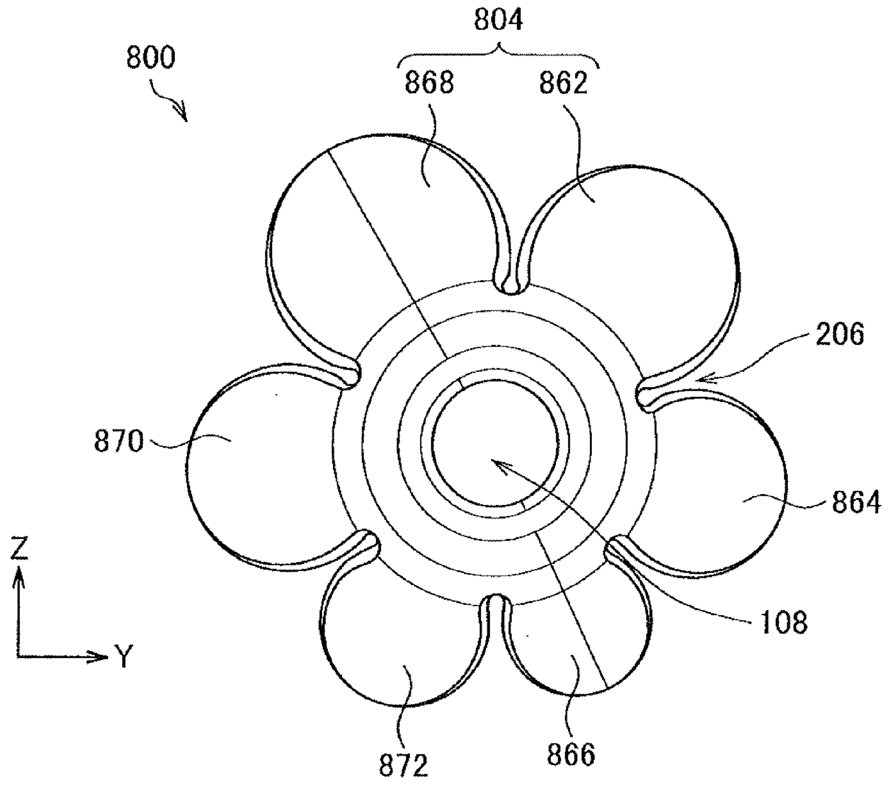
FIG. 12A is an explanatory diagram for describing an earpiece according to a eighth embodiment of the present invention.
Figure 12B:
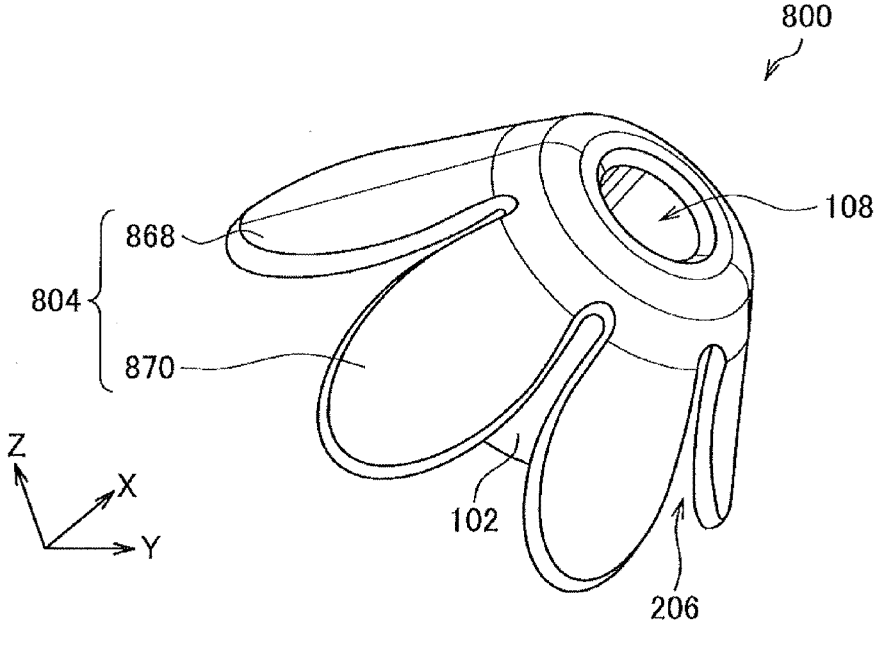
FIG. 12B is an explanatory diagram for describing the earpiece according to the embodiment.
Figure 12C:
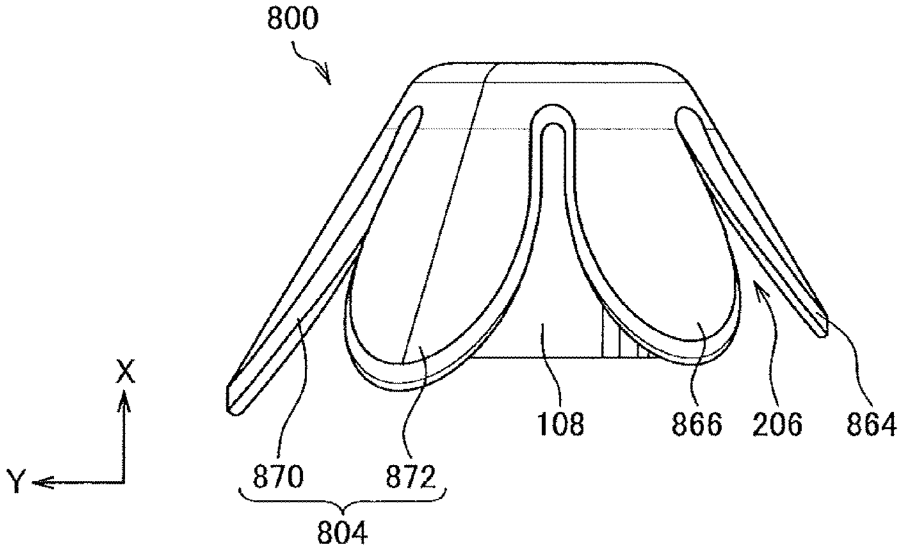
FIG. 12C is an explanatory diagram for describing the earpiece according to the embodiment.
Figure 12D:
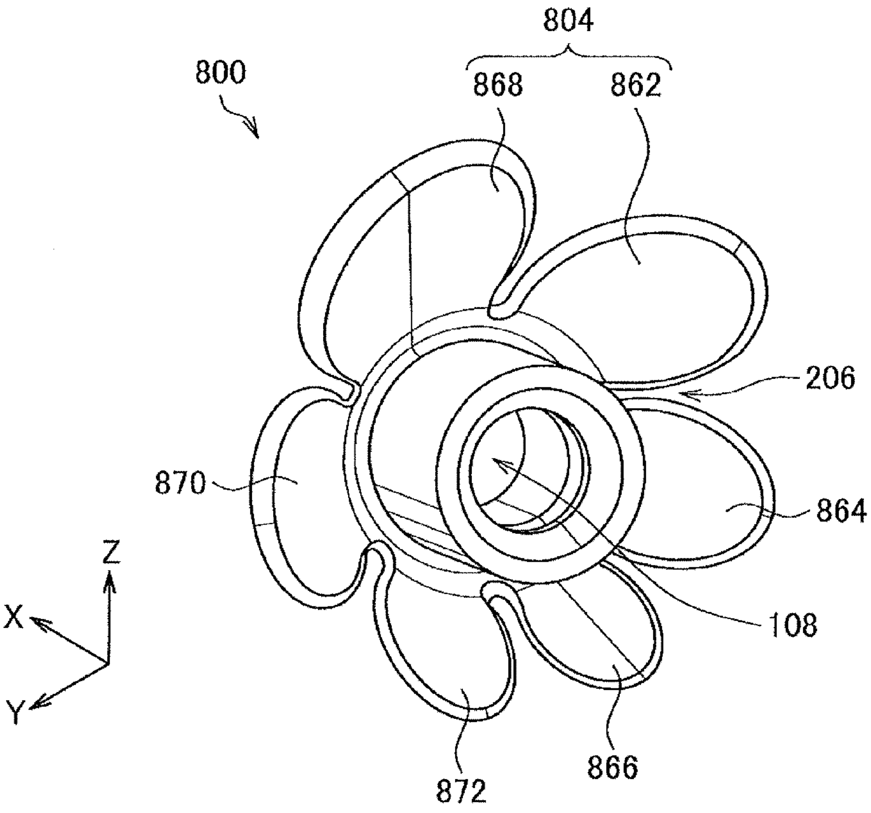
FIG. 12D is an explanatory diagram for describing the earpiece according to the embodiment.

FIGS. 12A to 12D are explanatory diagrams for describing an earpiece according to an eighth embodiment of the present invention. FIG. 12A is a top view of an earpiece as seen from above (X-axis positive direction) and FIG. 12B is a perspective view of the earpiece as seen from diagonally forward (X-axis positive, Y-axis negative, and Z-axis negative directions). FIG. 12C is a side view of the earpiece as seen from a lateral direction (Z-axis positive direction) and FIG. 12D is a perspective view of the earpiece as seen from diagonally rearward (X-axis negative, Y-axis positive, and Z-axis positive directions).

An earpiece 800 according to the present embodiment has a cap portion 804. The cap portion 804 has a cap piece 862, a cap piece 864, a cap piece 866, a cap piece 868, a cap piece 870, and a cap piece 872. The earpiece 800 is configured in the same manner as the earpiece 200 according to the second embodiment, except that the earpiece 800 has, instead of the cap portion 104, the cap portion 804 having the cap piece 862, the cap piece 864, the cap piece 866, the cap piece 868, the cap piece 870, and the cap piece 872. Therefore, here, the cap portion 804 including the cap piece 862, the cap piece 864, the cap piece 866, the cap piece 868, the cap piece 870, and the cap piece 872 will be mainly described and description of components, etc., that overlap those in the first and second embodiments is omitted.

As shown in FIG. 12A, the cap piece 862, the cap piece 864, the cap piece 866, the cap piece 868, the cap piece 870, and the cap piece 872 of the earpiece 800 differ in size between the cap pieces. As shown in FIG. 12A, in the earpiece 800 according to the present embodiment, the size gradually decreases in order of the cap piece 862, the cap piece 864, and the cap piece 866. Also, in the earpiece 800, the size gradually decreases in order of the cap piece 868, the cap piece 870, and the cap piece 872. The size indicates an area and also indicates the length in a rear-end surface side direction (X-axis negative direction).

When the earpiece 800 according to the present embodiment contracts in an ear canal EH, an area of the cap portion 804 that comes into contact with the ear canal EH varies between the cap pieces 862, 864, 866, 868, 870, and 872. In a state in which the user is standing, the user's ear canal EH is not parallel to the ground but has little inclination. Therefore, the earpiece 800 having the cap pieces 862, 864, 866, 868, 870, and 872 with different sizes can be placed in the ear canal EH with an inclination of the same level as the above-described inclination. As a result, the user can also obtain very good fit without sensing variations in pressure F between locations in the ear canal EH.

The shapes, materials, etc., of components other than the cap portion 804 of the earpiece 800 may be those of the earpiece 100, etc., according to the first to seventh embodiments.

The earpiece 800 according to the eighth embodiment of the present invention is described above. In the case of the earpiece 800 according to the eighth embodiment, too, as with the earpiece 100, etc., according to the first to seventh embodiments, the cap pieces 862, 864, 866, 868, 870, and 872 deform toward the side of a main unit 102, whereby uniform, moderate pressures F are applied to the ear canal EH, improving fit. In the earpiece 800 according to the present embodiment, since the size gradually decreases in order of the cap piece 862, the cap piece 864, and the cap piece 866 and in order of the cap piece 868, the cap piece 870, and the cap piece 872, the user can also obtain very good fit without sensing variations in pressure F between locations in the ear canal EH. However, an example in which cap pieces have different sizes is not limited to the cap pieces 862, 864, 866, 868, 870, and 872 of the earpiece 800 according to the present embodiment. Namely, the cap pieces 862, 864, 866, 868, 870, and 872 can take random sizes and shapes. Although, in the earpiece 100, etc., according to the first to eighth embodiments which have been described so far, the cap portion 104, etc., all have a single-layer structure, the cap portion 104, etc., do not necessarily need to have a single-layer structure. Next, as an example in which the cap portion 104, etc., have a multi-layer structure, an earpiece 900 according to a ninth embodiment of the present invention will be described.

(Ninth Embodiment: an earpiece having a cap portion having a multi-layer structure)

Figure 13A:
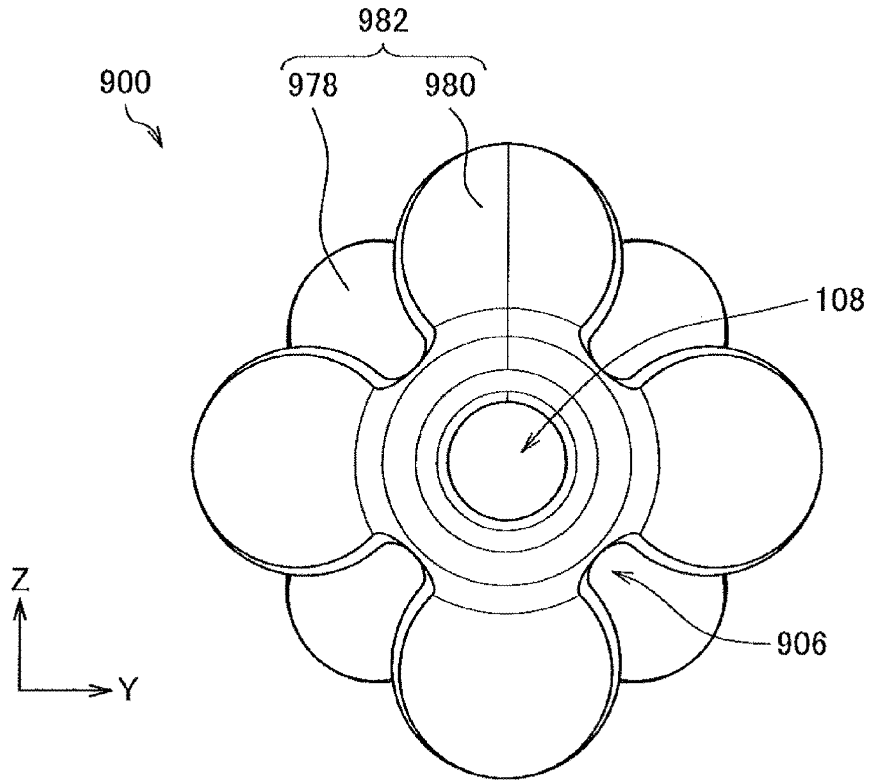
FIG. 13A is an explanatory diagram for describing an earpiece according to a ninth embodiment of the present invention.
Figure 13B:
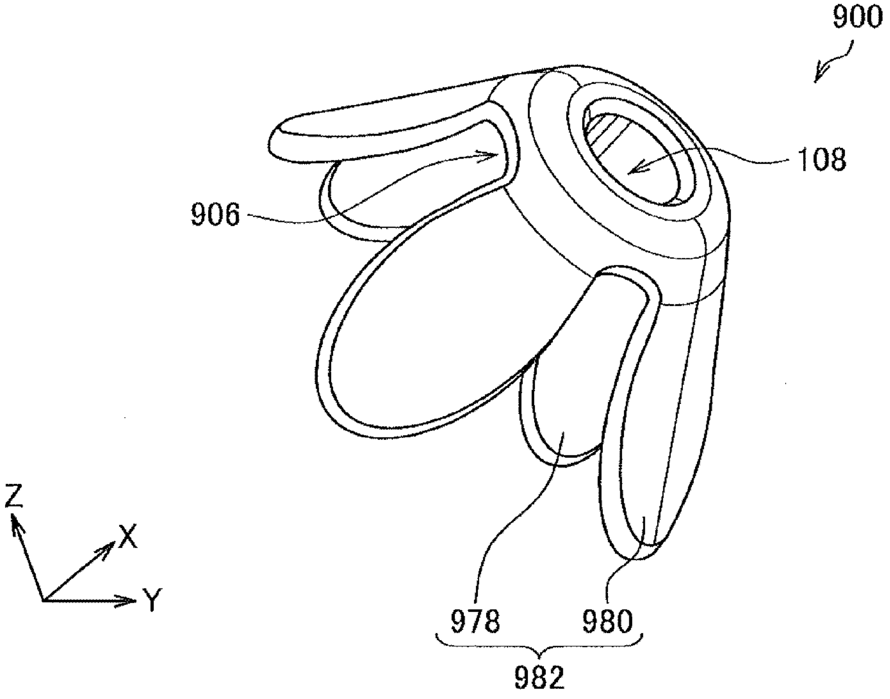
FIG. 13B is an explanatory diagram for describing the earpiece according to the embodiment.
Figure 13C:
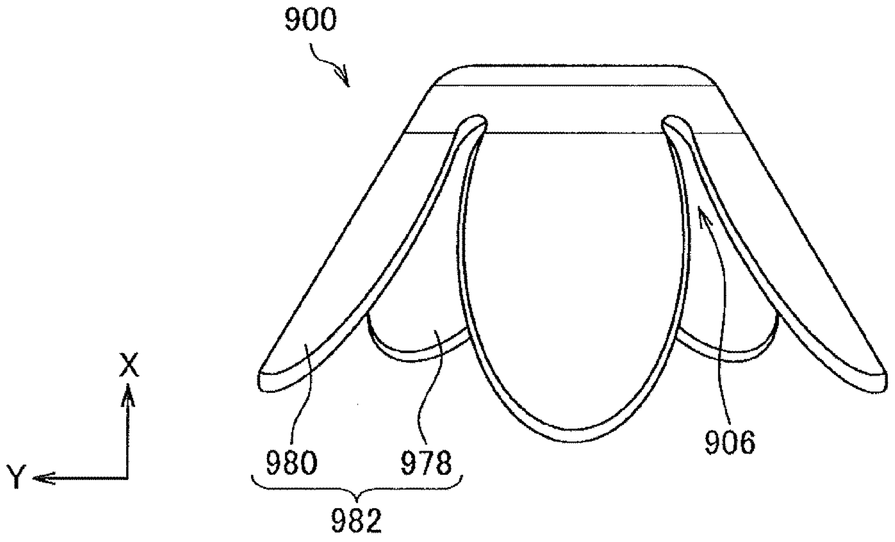
FIG. 13C is an explanatory diagram for describing the earpiece according to the embodiment.
Figure 13D:
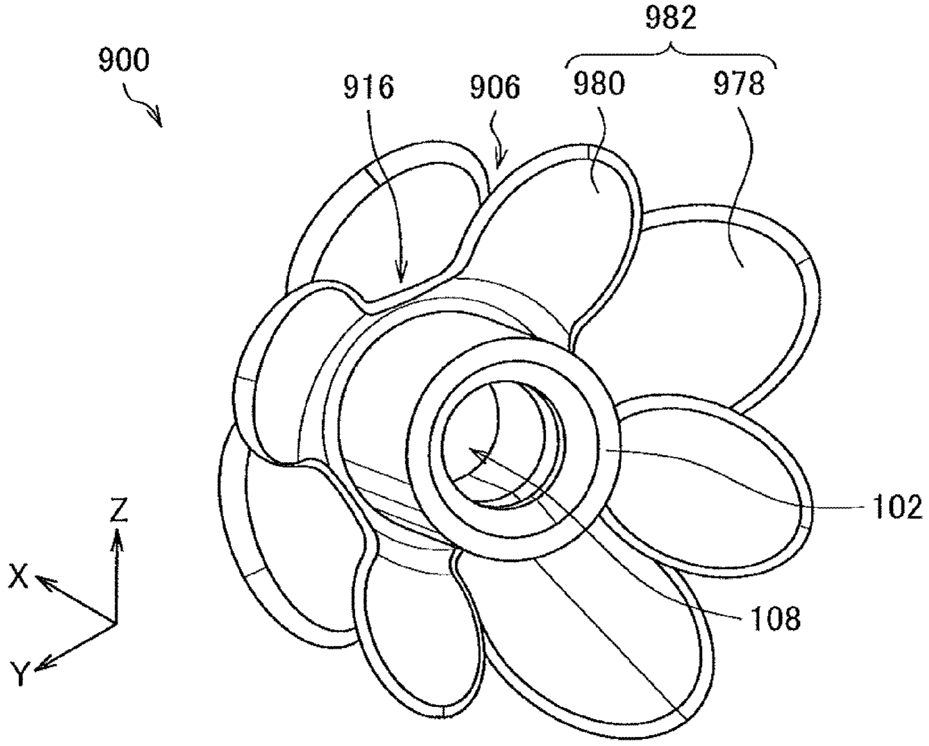
FIG. 13D is an explanatory diagram for describing the earpiece according to the embodiment.

FIGS. 13A to 13D are explanatory diagrams for describing an earpiece according to a ninth embodiment of the present invention. FIG. 13A is a top view of an earpiece as seen from above (X-axis positive direction) and FIG. 13B is a perspective view of the earpiece as seen from diagonally forward (X-axis positive, Y-axis negative, and Z-axis negative directions). FIG. 13C is a side view of the earpiece as seen from a lateral direction (Z-axis positive direction) and FIG. 13D is a perspective view of the earpiece as seen from diagonally rearward (X-axis negative, Y-axis positive, and Z-axis positive directions).

An earpiece 900 according to the present embodiment has a cap portion 982. The earpiece 900 is configured in the same manner as the earpiece 200 according to the second embodiment, except that the earpiece 900 has the cap portion 982 instead of the cap portion 104. Therefore, the cap portion 982 will be mainly described and description of components, etc., that overlap those in the first and second embodiments is omitted.

The cap portion 982 is formed of a two-layer structure having first cap pieces 978, first cutting portions 916, second cap pieces 980, and second cutting portions 906. The cap portion 982 of the earpiece 900 is formed of a two-layer structure in which two layers are stacked on top of each other in a thickness direction so as to be spaced apart from each other. As with the cap portion 104 of the earpiece 100 according to the first embodiment, the cap portion 982 has a film-like shape covering a portion of a main unit 102 on the front-end surface side (the side, in an X-axis positive direction, of the main unit 102). Also, the cap portion 982 has a shape in which the space between the main unit 102 and the cap portion 982 expands at least once as it goes in an X-axis negative direction. Furthermore, each cutting portion 916 adjacent to a first cap piece 978 and each cutting portion 906 adjacent to a second cap piece 980 are respectively formed at locations where they do not overlap each other. Although in the present embodiment, as shown in FIG. 13D, the earpiece 900 having the cap portion 982 having a two-layer structure is exemplified, the cap portion 982 may have a multi-layer structure other than a two-layer structure. For example, the structure may be a three-layer structure or may be a four-layer structure or may be an n-layer structure (n: a natural number). For example, an earpiece having a 10-layer structure has value not only as being placed in an ear but also as an ornament because it has a shape like a sea anemone and thus has a fine appearance.

The shapes, materials, etc., of components other than the cap portion 982 of the earpiece 900 may be those of the earpiece 100, etc., according to the first to eighth embodiments.

In such an earpiece 900, when the earpiece 900 is placed in an ear canal EH, the first cap pieces 978 contract and the second cap pieces 980 also contract. In the case of an earpiece other than the earpiece 900 such as that shown in FIG. 13D, each first cutting portion 916 and each second cutting portion 906 are respectively formed at locations where they do not overlap each other. The first cutting portions 916 and the second cap pieces 980 have an overlapping positional relationship. Also, the second cutting portions 906 and the first cap pieces 978 have an overlapping positional relationship.

Therefore, when the earpiece 900 is placed in the ear canal EH, space is less likely to be created between the ear canal EH and the earpiece 900. Furthermore, in the earpiece 900, even when the first cap pieces 978 deform in a direction other than the direction of the main unit 102, the second cap pieces 980 are less likely to similarly deform in the direction other than the direction of the main unit 102 in conjunction with the first cap pieces 978. Thus, from this point of view, too, when the earpiece 900 is placed in the ear canal EH, space is less likely to be created between the ear canal EH and the earpiece 900.

The earpiece 900 according to the ninth embodiment of the present invention is described above. In the case of the earpiece 900 according to the ninth embodiment, too, as with the earpieces 100 to 800 according to the first to eighth embodiments, the cap portion 982 deforms toward the side of the main unit 102, whereby uniform, moderate pressures F are applied to the ear canal EH, improving fit. In the earpiece 900 according to the present embodiment, since the earpiece 900 has the cap portion 982 having a two-layer structure, space is less likely to be created between the ear canal EH and the earpiece 900. In the earpieces 100 to 900 which have been described so far the cap portion 104, etc., are divided into the cap pieces 110, etc., by the cutting portions 206, etc. The cap portion 104, etc., do not necessarily need to be structured to be divided into the cap pieces 110, etc., by the cutting portions 206, etc. Hence, next, as an example in which a cap portion 1104 has cutting portions 1106 but is not divided, an earpiece 1100 according to a tenth embodiment of the present invention will be described.

(Tenth Embodiment: an earpiece having a cap portion that has cutting portions but is not divided)

Figure 14A:
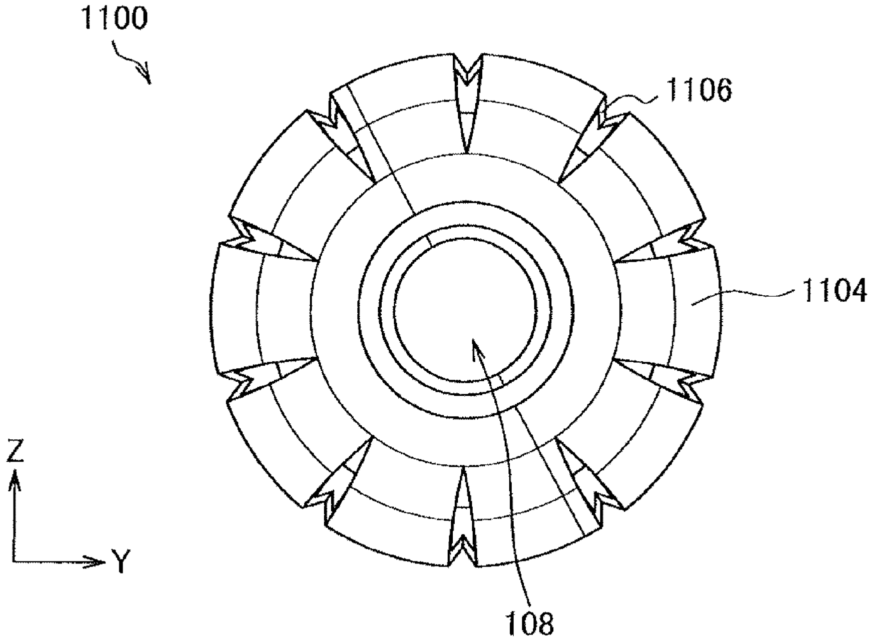
FIG. 14A is an explanatory diagram for describing an earpiece according to a tenth embodiment of the present invention.
Figure 14B:
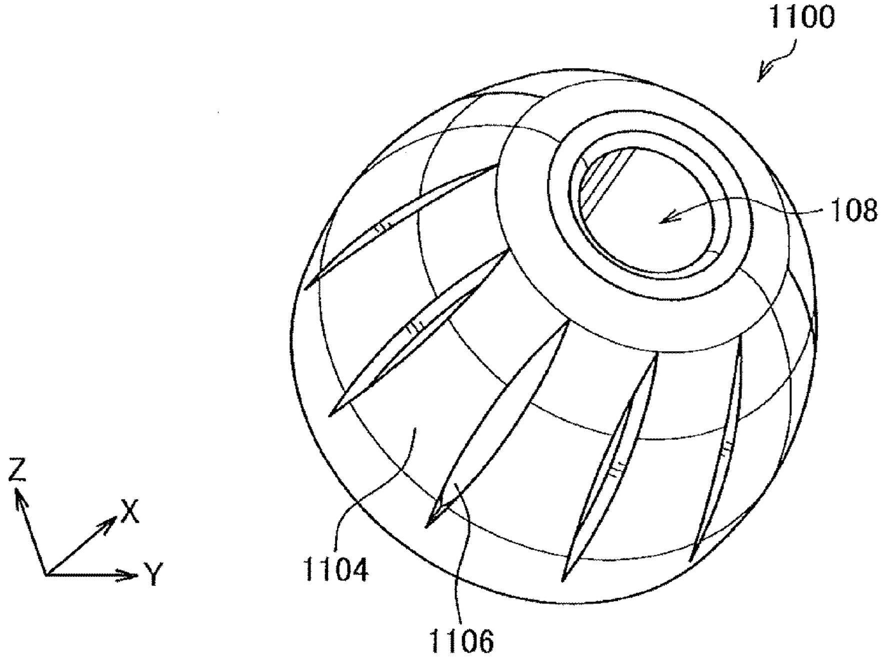
FIG. 14B is an explanatory diagram for describing the earpiece according to the embodiment.
Figure 14C:
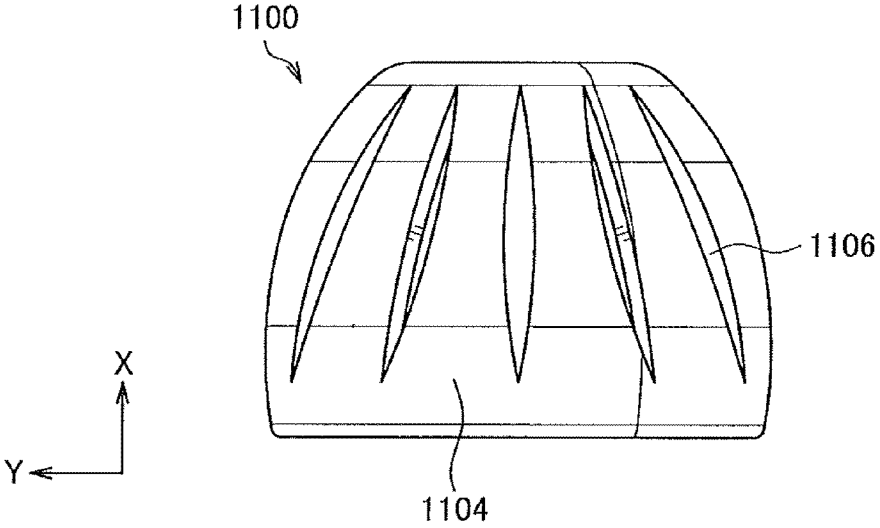
FIG. 14C is an explanatory diagram for describing the earpiece according to the embodiment.
Figure 14D:
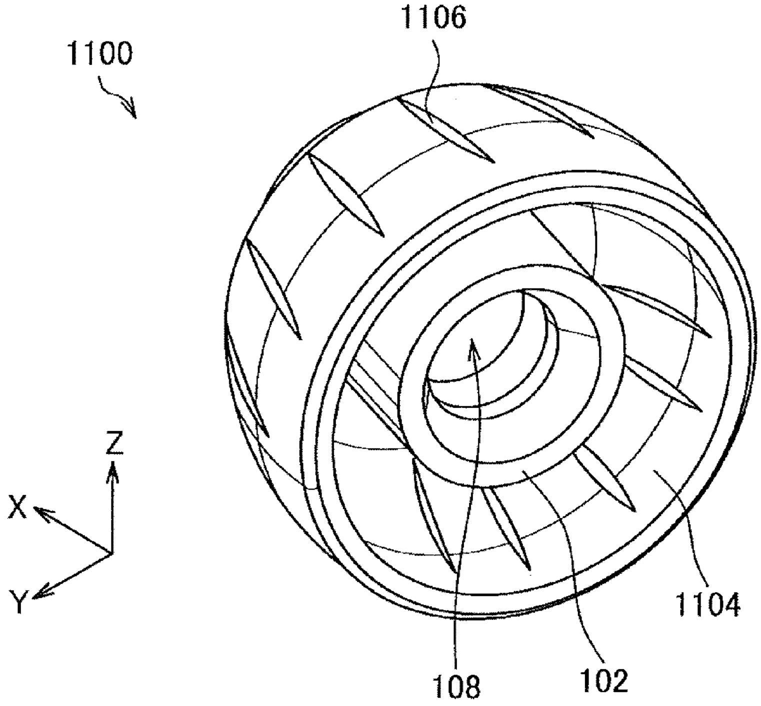
FIG. 14D is an explanatory diagram for describing the earpiece according to the embodiment.

FIGS. 14A to 14D are explanatory diagrams for describing an earpiece according to a tenth embodiment of the present invention. FIG. 14A is a top view of an earpiece as seen from above (X-axis positive direction) and FIG. 14B is a perspective view of the earpiece as seen from diagonally forward (X-axis positive, Y-axis negative, and Z-axis negative directions). FIG. 14C is a side view of the earpiece as seen from a lateral direction (Z-axis positive direction) and FIG. 14D is a perspective view of the earpiece as seen from diagonally rearward (X-axis negative, Y-axis positive, and Z-axis positive directions).

A cap portion 1104 has cutting portions 1106. As shown in FIG. 14C, in an earpiece 1100, cuttings of the cutting portions 1106 are formed in a direction of making a through hole of a main unit 102, i.e., in an X-axis negative direction. The cuttings, however, are not formed all the way to the most rear-end side of the cap portion 1104 (the side, in a most X-axis negative direction, of the cap portion 1104). That is, the cutting portions 1106 of the earpiece 1100 make through holes in the cap portion 1104.

Since in the earpiece 1100 the cap portion 1104 has through holes made therein without being divided, even when, for example, the earpiece 1100 receives a shock, the cap portion 1104 is less likely to spread out and thus excellent durability is provided.

The shapes, materials, etc., of components other than the cap portion 1104 of the earpiece 1100 which is not divided may be those of the earpiece 100 described with reference to FIG. 1. The shapes and lengths of cuttings do not need to be all the same and some of them may be different or all of them may be different.

The earpiece 1100 according to the tenth embodiment of the present invention is described above. In the case of the earpiece 1100 according to the tenth embodiment, too, as with the earpiece 100, etc., according to the first to ninth embodiments, the cap portion 1104 deforms toward the side of the main unit 102, whereby uniform, moderate pressures F are applied to an ear canal EH, improving fit. In the earpiece 1100 according to the present embodiment, since through holes are made in the cutting portions 1106 without the cap portion 1104 being divided, even when, for example, the earpiece 1100 receives a shock, the cap portion 1104 is less likely to spread out and thus excellent durability is provided.

<4. Conclusions>

Finally, functional configurations of earpieces according to the embodiments of the present invention and examples of actions and effects obtained by the functional configurations, etc., will be briefly summarized.

First, functional configurations of earpieces according to the embodiments of the present invention can be represented as follows. The earpieces have a main unit and a cap portion.

The main unit has a cylindrical shape having made therein a through hole that can allow sound to be transmitted therethrough. The cap portion has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as it goes toward the rear-end surface side. The earpiece has at least one cutting portion formed in the cap portion so that the cap portion can deform in a direction of the main unit.

According to the earpiece, since the earpiece has a cutting portion in a cap portion, when the earpiece is placed in an ear canal, the cap portion deforms in a direction of a main unit along the shape of an inner wall surface of the ear canal. Thus, without applying local force to the user's ear canal, fit can be improved. In addition, when the cap portion deforms in the direction of the main unit, space created by the cutting portion decreases and thus sound leakage is kept to a minimum. Accordingly, fit can be improved without degrading sound quality. Such effects can be obtained because the earpiece has the cutting portion and thus can contract according to the size of the ear canal and such abnormal deformation does not occur that applies local pressure to the ear canal. As such, the earpiece having the above-descried configuration can deform fitting in various ear canal sizes.

At least two cutting portions of the earpiece may be formed from an end of the cap portion on the rear-end surface side toward the front-end surface side, and the cap portion may be divided into two or more cap pieces which are connected to each other on the front-end surface side.

According to this configuration, since the cap portion is divided into two or more cap pieces, the cap pieces easily overlap each other and thus the earpiece can more stably contract without causing abnormal deformation in the ear canal.

The above-described earpiece may be such that in at least one cutting portion is formed an extension cap piece that is formed to extend from one of cap pieces divided by the cutting portion toward an other cap piece and that covers a part of the cutting portion, and a thickness of the extension cap piece decreases as it goes farther away from the one cap piece, so that the extension cap piece overlaps the other cap piece when the cap portion deforms in the direction of the main unit.

According to this configuration, when the cap portion contracts toward the main unit side upon placement, the extension cap piece overlaps an adjacent cap piece (other cap piece), decreasing space created by the cutting portion between cap pieces. As a result, the possibility of occurrence of sound leakage can be further reduced.

The above-described earpiece may further include a connecting film that is formed in the at least one cutting portion, to a thickness thinner than the cap portion and that connects two cap pieces divided by the cutting portion.

According to this configuration, since a connecting film is formed in a cutting portion between cap pieces, when the cap portion contracts toward the main unit side upon placement, space created by the cutting portion can be further reduced. Thus, sound leakage can be further prevented and sound quality can be further improved. The cap pieces are connected to each other through the connecting film and deform in conjunction with each other. Thus, since a plurality of cap pieces can uniformly deform through the connecting film, for example, one cap piece can be prevented from overlapping another cap piece adjacent thereto more than necessary or abnormal deformation can be prevented from occurring. This fact can provide not only the aforementioned improvement in sound quality, etc., but also an effect of enhancement of fit by reducing local pressure applied to the ear canal.

In the above-described earpiece, the connecting film may have a shape bending toward a side of the main unit between the two divided cap pieces.

According to this configuration, since the connecting film bends toward the main unit side, when the earpiece is placed, the connecting film can further bend in the bending direction. Thus, abnormal deformation of the connecting film itself can be prevented. As a result, a load is less likely to be applied to the ear canal and also sound leakage is less likely to occur.

The above-described earpiece may further include a supporting portion between the main unit and the cap portion near a connecting location of the front-end surface of the main unit to the cap portion, the supporting portion supporting the cap portion.

According to this configuration, a supporting portion can strengthen an elastic force at the base of a cap piece. Therefore, when a user places the earpiece in his/her ear canal, the cap portion contracts while providing a repelling force to the ear by its elastic force, whereby space between the cap portion and the ear canal is reduced and sound leakage can be prevented and fit can be improved. It is desirable that the cap pieces, etc., be formed by elastic members but the elastic force of the elastic members may decrease due to deterioration over time or excess deformation. On the other hand, when a supporting portion is formed, as in the above-described configuration, such a decrease in elastic force can be compensated for, which can in turn improve the durability of the earpiece.

In the above-described earpiece, the cap portion may have a multi-layer structure in which layers are stacked on top of each other in a thickness direction so as to be spaced apart from each other, and the cutting portion may be formed at different locations for the different layers.

As in this configuration, when the cap portion has a multi-layer structure and the locations of cutting portions are different between layers, the cutting portions do not overlap each other, enabling to further reduce space created by the cutting portions. In addition, even when a cap piece deforms in a direction other than the direction of the main unit, an auxiliary cap piece adjacent thereto is less likely to similarly deform in the direction other than the direction of the main unit in conjunction with the cap piece. This fact can also make space less likely to be created between the ear canal and the earpiece when the earpiece is placed in the ear canal.

In the above-described earpiece, the cutting portion may be formed in a portion of the cap portion between the rear-end surface side and the front-end surface side to make a through hole in the cap portion in the direction of making the through hole.

According to this configuration, in the earpiece, since the cap portion is not divided, even when the earpiece receives a shock, the cap pieces are less likely to spread out, enabling to improve durability.

In the above-described earpiece, the cutting portions may be formed in a width in which space between the divided cap pieces expands as it goes toward the rear-end surface side.

According to this configuration, when the earpiece is placed in the ear canal and contracts, the cap pieces do not overlap each other more than necessary and thus fit can be further improved.

In the above-described earpiece, the cutting portions may be formed in a length shorter than a length of the cap portion from the rear-end surface side to the front-end surface side.

According to this configuration, when the earpiece is placed in the ear canal and contracts, the cap pieces are less likely to deform in directions other than the direction of the main unit. In addition, at a base portion of cap pieces where a cutting portion is not formed, the cap pieces are connected to each other and thus the strength of the base portion of the cap pieces is increased. Accordingly, abnormal deformation such as excess deformation of the cap pieces can be prevented.

It should be understood by those skilled in the art that various modifications, combinations, sub-combinations and alterations may occur depending on design requirements and other factors insofar as they are within the scope of the appended claims or the equivalents thereof.

Although the above-described embodiments describe, for example, the case in which a plurality of cutting portions 106 are formed in a cap portion 104, the present invention is not limited thereto. Namely, one cutting portion 106 may be formed in the cap portion 104. In this case, although the cap portion 104 is not divided into a plurality of cap pieces 110, smooth deformation toward the side of a main unit 102 is enabled by the cutting portion 106 and thus fit can be improved.

The present application contains subject matter related to that disclosed in Japanese Priority Patent Application JP 2008-304885 filed in the Japan Patent Office on 28 Nov. 2008, the entire content of which is hereby incorporated by reference.

What is claimed is:

1. An earpiece comprising:

a main unit having a cylindrical shape having made therein a through hole that can allow sound to be transmitted therethrough;

a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as the cap portion extends toward the rear-end surface side; and at least one cutting portion formed in the cap portion so that the cap portion can deform in a direction of the main unit, wherein at least two cutting portions are formed from an end of the cap portion on the rear-end surface side toward the front-end surface side, and the cap portion is divided into two or more cap pieces which are connected to each other on the front-end surface side, and wherein, prior to insertion of the earpiece into a user's ear, the cutting portions are formed in a length shorter than a length of the cap portion from the rear-end surface side to the front-end surface side.

2. The earpiece according to claim 1, wherein an extension cap piece is formed in at least one cutting portion and extends from one of the cap pieces divided by the cutting portion toward another cap piece and that covers a part of the cutting portion, and a thickness of the extension cap piece decreases as it goes farther away from the one cap piece, so that the extension cap piece overlaps the other cap piece when the cap portion deforms in the direction of the main unit.

3. The earpiece according to claim 1, further comprising a connecting film that is formed in the at least one cutting portion and having a thickness thinner than the cap portion, the connecting film connecting two cap pieces divided by the cutting portion.

4. The earpiece according to claim 3, wherein, prior to insertion of the earpiece into a user's ear, the connecting film has a shape bending toward a side of the main unit between the two divided cap pieces.

5. The earpiece according to claim 1, further comprising a supporting portion between the main unit and the cap portion near a connecting location of the front-end surface of the main unit to the cap portion, the supporting portion supporting the cap portion.

6. The earpiece according to claim 1, wherein the cap portion has a multi-layer structure in which layers are stacked on top of each other in a thickness direction so as to be spaced apart from each other, and the cutting portion is formed at different locations for the different layers.

7. The earpiece according to claim 1, wherein the cutting portion is formed in a portion of the cap portion between the rear-end surface side and the front-end surface side to make a second through hole in the cap portion in the direction of making the through hole.

8. The earpiece according to claim 1, wherein the cutting portions are formed in a width in which space between the divided cap pieces expands as the cutting portions extend toward the rear-end surface side.

9. An earpiece comprising:

a main unit having a cylindrical shape having made therein a through hole that can allow sound to be transmitted therethrough;

a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as the cap portion extends toward the rear-end surface side;

at least one cutting portion formed in the cap portion so that the cap portion can deform in a direction of the main unit; and a supporting portion between the main unit and the cap portion near a connecting location of the front-end surface of the main unit to the cap portion, the supporting portion supporting the cap portion.

10. An earpiece comprising:

a main unit having a cylindrical shape having made therein a through hole that can allow sound to be transmitted therethrough;

a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as the cap portion extends toward the rear-end surface side; and at least one cutting portion formed in the cap portion so that the cap portion can deform in a direction of the main unit, wherein the cap portion has a multi-layer structure in which layers are stacked on top of each other in a thickness direction so as to be spaced apart from each other, and the cutting portion is formed at different locations for the different layers.

11. An earpiece comprising:

a main unit having a cylindrical shape having made therein a through hole that can allow sound to be transmitted therethrough;

a cap portion that has a film-like shape which is formed to extend from all around a front-end surface, in a direction of making the through hole, of the main unit toward a rear-end surface side, and which covers at least a portion of the main unit on the front-end surface side, and in which space between the main unit and the cap portion expands as the cap portion extends toward the rear-end surface side; and at least one cutting portion formed in the cap portion so that the cap portion can deform in a direction of the main unit, wherein the cutting portion is formed in a portion of the cap portion between the rear-end surface side and the front-end surface side to make a second through hole in the cap portion in the direction of making the through hole.

* * * * *